United States Patent
Tomezak et al.

(10) Patent No.: US 8,374,270 B2
(45) Date of Patent: Feb. 12, 2013

(54) CONSTELLATION DETECTION IN A MULTI-MODE QAM COMMUNICATIONS SYSTEM

(75) Inventors: Greg Tomezak, Buffalo Grove, IL (US); Mark Fimoff, Hoffman Estates, IL (US)

(73) Assignee: Intersil Americas Inc., Milpitas, CA (US)

( * ) Notice: Subject to any disclaimer, the term of this patent is extended or adjusted under 35 U.S.C. 154(b) by 252 days.

(21) Appl. No.: 12/698,066

(22) Filed: Feb. 1, 2010

(65) Prior Publication Data

US 2010/0322348 A1 Dec. 23, 2010

Related U.S. Application Data

(60) Provisional application No. 61/187,986, filed on Jun. 17, 2009, provisional application No. 61/187,970, filed on Jun. 17, 2009, provisional application No. 61/187,977, filed on Jun. 17, 2009, provisional application No. 61/187,980, filed on Jun. 17, 2009, provisional application No. 61/187,996, filed on Jun. 17, 2009.

(51) Int. Cl.
  *H04L 5/12* (2006.01)
  *H04L 23/02* (2006.01)
(52) U.S. Cl. .......... 375/261; 375/259; 375/260
(58) Field of Classification Search .......... 375/261
  See application file for complete search history.

(56) References Cited

U.S. PATENT DOCUMENTS

| | | | |
|---|---|---|---|
| 5,559,808 A | 9/1996 | Kostreski et al. | |
| 6,882,634 B2 | 4/2005 | Bagchi et al. | |
| 7,003,030 B2 | 2/2006 | Abdelilah et al. | |
| 7,089,577 B1 | 8/2006 | Rakib et al. | |
| 7,248,841 B2 | 7/2007 | Agee et al. | |
| 7,860,147 B2* | 12/2010 | Moffatt | 375/132 |
| 8,064,545 B2* | 11/2011 | Bock | 375/332 |
| 2002/0141505 A1* | 10/2002 | Lundby | 375/261 |
| 2003/0099302 A1* | 5/2003 | Tong et al. | 375/264 |
| 2004/0151108 A1* | 8/2004 | Blasco Claret et al. | 370/206 |
| 2004/0258172 A1* | 12/2004 | Zhang | 375/261 |
| 2005/0157804 A1* | 7/2005 | Jones | 375/261 |
| 2005/0220178 A1* | 10/2005 | Ginis | 375/219 |
| 2007/0116144 A1* | 5/2007 | Wang et al. | 375/295 |
| 2008/0170636 A1* | 7/2008 | Han | 375/261 |
| 2008/0225973 A1* | 9/2008 | Bock | 375/261 |
| 2009/0190609 A1* | 7/2009 | Basso et al. | 370/465 |
| 2009/0274243 A1* | 11/2009 | Lee et al. | 375/295 |
| 2010/0290565 A1* | 11/2010 | Cheong | 375/320 |
| 2011/0080981 A1* | 4/2011 | Su et al. | 375/341 |
| 2011/0255623 A1* | 10/2011 | Golitschek Edler Von Elbwart et al. | 375/261 |

OTHER PUBLICATIONS

PCT International Search Report for PCT/US2010/022772 dated Jun. 7, 2010.

\* cited by examiner

*Primary Examiner* — Erin File
(74) *Attorney, Agent, or Firm* — Arent Fox LLP

(57) ABSTRACT

Systems and methods for determining an unknown QPSK or QAM constellation from a set of possible received constellations are described. One method utilizes a histogram of the power of the signal after inter-symbol-interference has been minimized with a modified constant modulus algorithm equalizer. The constellation may be determined before carrier frequency and phase has been fully recovered. An unknown QPSK or QAM constellation may be identified before or after equalization using disclosed methods for analyzing an output power histogram.

12 Claims, 21 Drawing Sheets

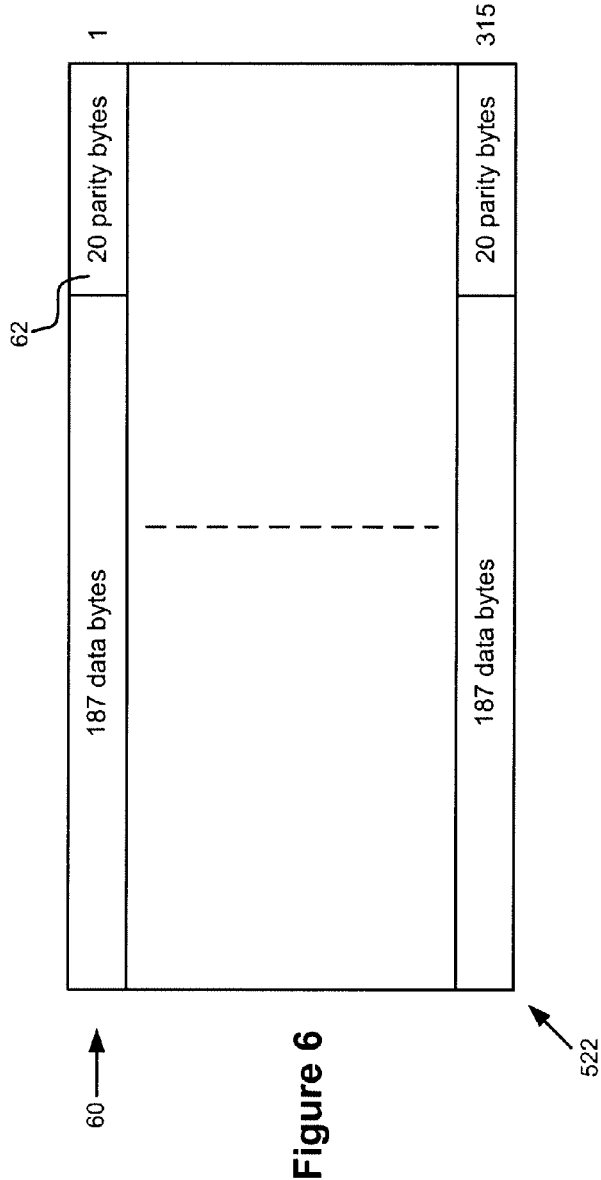
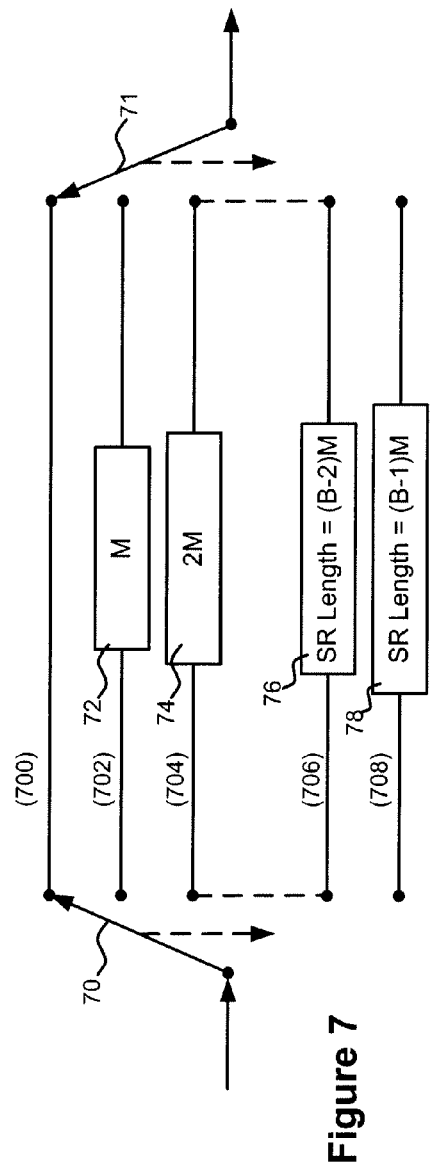
Figure 6
Figure 7

CONSTELLATION DETECTION IN A MULTI-MODE QAM COMMUNICATIONS SYSTEM

CROSS-REFERENCE TO RELATED APPLICATIONS

The present Application claims priority from U.S. Provisional Patent Application No. 61/187,970 filed Jun. 17, 2009, entitled "SLOC Analog Equalizer For Baseband Video Signal," and from U.S. Provisional Patent Application No. 61/187,977 filed Jun. 17, 2009, entitled "A Method For Constellation Detection In A Multi-Mode QAM Communications System," and from U.S. Provisional Patent Application No. 61/187,980 filed Jun. 17, 2009, entitled "Novel Carrier Phase Offset Correction For A QAM System," and from U.S. Provisional Patent Application No. 61/187,986 filed Jun. 17, 2009, entitled "Novel Frame Structure For A QAM System," and from U.S. Provisional Patent Application No. 61/187,996 filed Jun. 17, 2009, entitled "SLOC SPOT Monitoring," which applications are hereby expressly incorporated by reference herein.

The present Application is related to U.S. patent application Ser. No. 12/363,669, filed Jan. 30, 2009, entitled "Mixed Format Media Transmission Systems and Methods," which is hereby incorporated herein by reference.

BACKGROUND OF THE INVENTION

1. Field of the Invention

The present invention relates generally to multimedia transmission systems and more particularly to systems and methods for transmitting high definition digital video and standard definition analog video over a single cable.

2. Description of Related Art

Framing in Digital Communications Systems

Digital data streams generally have some sort of frame structure such that the data is organized into uniformly sized groups of bits or bytes. Any system that uses block based forward error correction (FEC) will have frames organized around the error correction code word size. Also, if the system uses interleaving to combat impulse noise, the frame structure will be arranged with the interleaver parameters in mind. If the system uses data randomization to achieve a flat spectrum, the pseudo-random sequence utilized may be synchronized to the frame structure, restarting at the beginning of each frame.

For an RF digital communications system, a receiver must typically first achieve carrier and symbol clock synchronization and equalization. It can then recover the transmitted data. But, to make sense of this incoming data stream, the receiver must also synchronize to the frame structure. In other words, the receiver must know where the error correction code words start and end. It also must be able to synchronize receiver modules such as the deinterleaver to match the interleaver operation of the transmitter so that the resultant deinterleaved bits or bytes are correctly ordered, and the de-randomizer to match the starting point of the pseudo-random sequence used in the transmitter to flatten the spectrum.

Conventional systems often provide for receiver frame synchronization by appending a known pattern of symbols of a fixed length at the beginning or end of the frame. This same pattern repeats every frame, and it often consists of a 2 level (i.e. binary) pseudo-random sequence with favorable auto-correlation properties. This means that while the auto-correlation of the sequence with itself at zero offset yields a large value, if the offset is non-zero the correlation value (sidelobe) is very small. Also, the correlation for this frame sync sequence with random symbols will yield a small value. Therefore, if the receiver executes a correlation of the incoming symbols with a stored version of the frame sync pattern, it should expect to yield a large value only at the exact start of each frame. The receiver can then easily determine the starting point of each frame. There can be several modes of operation for the communication system. The modes can include a variety of combinations of symbol constellations, trellis codes, and interleave patterns. The receiver must have knowledge of the mode in order to successfully recover the transmitted data. This can be achieved by adding additional mode symbols to the frame sync pattern. These mode symbols can be reliably received by using correlation methods since they are sent repeatedly every frame. They can be made even more robust by encoding them using a block code.

Examples of Frame Structure in Existing Systems

With reference to FIG. 1, the ATSC digital television (DTV) terrestrial transmission standard adopted in 1996 provides a system in which data is transmitted in frames. Each frame 10 is composed of 313 segments, and each segment contains 832 symbols for a total of 260,416 symbols per frame. The first four symbols in each segment are segment sync symbols 12 comprising the sequence [+5, −5, −5, +5]. The first segment in each frame is a frame sync segment 14 with 312 data segments 16, 18. Referring now to FIG. 2, frame sync segment 14 has a segment sync 200, a 511 symbol pseudo-random noise (PN511) sequence 202, a 63 symbol pseudo-random noise (PN63) sequence 204, a second PN63 sequence 206 and a third PN63 sequence 208. This is followed by 24 mode symbols 210 indicating that the mode is 8 VSB. Pre-code symbols 214 and reserved symbols 212 complete frame sync segment 14.

The segment sync 200 and PN511 202 symbols are a priori known to the receiver and may be used to acquire frame synchronization via correlation methods. All of the aforementioned symbols come from the set {+5, −5}. The last 12 symbols of this segment are from the set {−7 −5 −3 −1 +1 +3 +5 +7}, and are duplicates of the last 12 symbols of the preceding data field. These are called the precode symbols (not discussed here).

Referring also to FIG. 3, for each of the subsequent 312 segments of the field, referred to as data segments, the 828 symbols 32 following the four segment sync symbols 30 are created from a single 207 byte (1656 bit) Reed-Solomon (RS) code-word by taking 2 bits at a time, trellis encoding them into 3 bits, then mapping each unit of 3 bits to an 8 level symbol from the set {−7 −5 −3 −1 +1 +3 +5 +7}.

Another example of framing in a digital communications system is seen in the ISDB-T system. Unlike the single-carrier ATSC system, ISDB-T is a multi-carrier system utilizing coded orthogonal frequency division multiplexing ("COFDM"). For example, mode 1 for ISDB-T uses 1404 carriers. A frame consists of 204 COFDM symbols and each COFDM symbol can be thought of as a combination of 1404 independent QAM symbols, one for each of the carriers. Thus, the frame is composed of a combination of 204×1404=286416 QAM symbols. Of these, 254592 are data, and 31824 comprise both pilot information (which can be used for frame synchronization) and mode information which are scattered throughout the frame in a known pattern. A simplified view of this frame arrangement is shown in FIG. 4. It can be seen that the pilot and mode information is scattered about the frame in a known pattern.

This system has modes that utilize three different QAM constellations—QPSK, 16 QAM, and 64 QAM. It also supports five different trellis coding rates (½, ⅔, ¾, ⅚, ⅞) based on a single punctured mother code. This well-known technique makes it very economical to construct a single Viterbi decoder in the receiver that can easily be adjusted to decode all five of the specified codes. Prior to trellis coding at the transmitter, the data is formed into 204 byte (1632 bits) long RS blocks. While the number of COFDM symbols per frame is always constant, the number of RS blocks per frame varies with the selected mode, but most importantly, that number is always an integer. This allows for easy RS block synchronization in the receiver once frame sync has been established and the trellis code rate is known. In order for this to be true, the number of data bits per frame prior to trellis coding must be evenly divisible by 1632 for all modes.

TABLE 1

Data Bits per Frame for ISDB-T

| mode | data bits/frame (before trellis coding) | | | | | bits/frame after trellis coding |
| --- | --- | --- | --- | --- | --- | --- |
| | ½ | ⅔ | ¾ | ⅚ | ⅞ | |
| QPSK | 254592 | 339456 | 381888 | 424320 | 445536 | 509184 |
| 16 QAM | 509184 | 678912 | 763776 | 848640 | 891072 | 1018368 |
| 64 QAM | 763776 | 1018368 | 1145664 | 1272960 | 1336608 | 1527552 |

Table 1 shows the number of data bits per frame for all the modes (combination of QAM constellation and trellis code rate). In every case the number of data bits per frame is evenly divisible by 1632 (data bits means bits before trellis coding).

BRIEF SUMMARY OF THE INVENTION

Systems and methods for determining an unknown QAM constellation from a set of possible received QAM constellations are described. One method utilizes a histogram of the power of the signal after inter-symbol-interference (ISI) has been minimized with a modified constant modulus algorithm ("CMA") equalizer, but before carrier frequency and phase has been fully recovered. The unknown constellation is then determined from said histogram. The equalization process is then restarted with the standard CMA to minimize the ISI, based on the now known constellation. The equalizer output can be correctly scaled, after which stages of reduced constellation carrier recovery ("RCCR") and decision directed carrier recovery can be performed, resulting in recovery of the carrier frequency and phase by the combined equalizer carrier frequency/phase loop.

Another method for determining an unknown QAM constellation is described, in which the equalizer initially operates using the modified CMA to minimize the ISI. Although the equalizer output may not be correctly scaled at this point in the process, the equalizer carrier frequency/phase loop may use RCCR to recover the carrier frequency and phase without knowing the constellation. The recovered phase may be noisy. The receiver may read information embedded in the signal frame that indicates which QAM constellation is being transmitted. The equalizer operation is then restarted with a standard CMA based on the known constellation, followed by RCCR and decision directed carrier recovery.

Certain embodiments of the invention provide systems and methods for identifying symbol constellations, the method being performed by one or more processors of a multi-mode quadrature amplitude modulated communications system which execute instructions that cause the one or more processors to perform steps of a process. These steps comprise characterizing power distribution in a signal, determining one or more peak occurrences of power levels within the power distribution, and determining the constellation based on distribution of the peak occurrences. In some of these embodiments, the power distribution statistically tracks occurrences of power levels detected in the signal. In some of these embodiments, the constellation is determined based on spread of the one or more peak occurrences.

In some of these embodiments, the signal is an equalized signal. In some of these embodiments, the one or more processors determine the constellation by examining a plurality of sections in a histogram of the power distribution. In some of these embodiments, each of the sections corresponds to a range of power levels associated with one but not all of a plurality of constellation candidates. In some of these embodiments, the plurality of constellation candidates includes a quadrature phase shift key (QPSK) constellation and a quadrature amplitude modulation (QAM) constellation. In some of these embodiments, the plurality of constellation candidates includes one or more of 16-QAM, 64-QAM, 256-QAM and 4096-QAM constellations.

In some of these embodiments, the steps comprise establishing reliability of an identified constellation by performing additional steps for each of a succession of constellation determinations. In some of these embodiments, the additional steps include incrementing a counter when a succeeding determination confirms the identity of the constellation. In some of these embodiments, the additional steps include decrementing the counter when a succeeding determination identifies a different constellation. The additional steps may include providing a measure of reliability based on the value of the counter. In some embodiments, the constellation is identified when the counter exceeds a threshold value and the counter may be selected from a set of counters where each counter is associated with one of a plurality of constellation candidates. A constellation is identified when its corresponding counter exceeds a threshold value. In certain embodiments, the peak occurrences of power levels correspond to corner symbols of the constellation. The constellation can be identified before the signal is equalized.

Certain embodiments of the invention provide systems and methods for identifying a constellation of symbols in a multi-mode quadrature amplitude modulated communications system, the method being performed by a processor in a modem of the communications system. In some of these embodiments, the method comprises executing instructions that cause the processor to extract mode information from the frame of data in response to detection of a start of a frame of data received at the modem, determining a current constellation by selecting from a plurality of potential constellation codes a code that most closely matches a corresponding code in the mode bits, increasing a confidence metric associated with the previously identified constellation if the current constellation matches a previously determined constellation, decreasing the confidence metric and recording the current constellation as the previously identified constellation if the current constellation is different from the previously identified constellation and repeating the steps of extracting mode information, selecting a current constellation and adjusting the confidence metric for subsequent frames of data until the confidence metric exceeds a predetermined threshold. The constellation may be identified when the confidence metric exceeds the predetermined threshold.

In certain embodiments, selecting a constellation code includes causing the processor to perform cross-correlations for each of the plurality of potential constellation codes with the corresponding code bits. The constellation may be identified in an unequalized signal that carries the frame of data and subsequent frames of data. In certain embodiments, the constellation is identified while the processor is recovering a carrier from the signal. Certain embodiments employ a constant modulus algorithm (CMA) to calculate an error signal used for converging equalizer filter taps to permit equalization of the signal. The error signal is calculated using a scaled CMA parameter to improve equalization performance.

In certain embodiments, performing equalization of the signal includes analyzing histograms of power of the equalized signal. Analyzing the histograms can include using a probability mass function. Equalizing the signal may include calculating the power associated with a plurality of symbols in the equalized signal. The signal may be equalized by identifying corner symbols of the constellation by using a threshold power level. The threshold power level may indicate the identity of the constellation.

BRIEF DESCRIPTION OF THE DRAWINGS

FIG. 6 is a block representation of a frame structure employed in certain embodiments of the invention.

FIG. 7 illustrates operation of a convolutional byte interleaver in certain embodiments of the invention.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Figure 1:
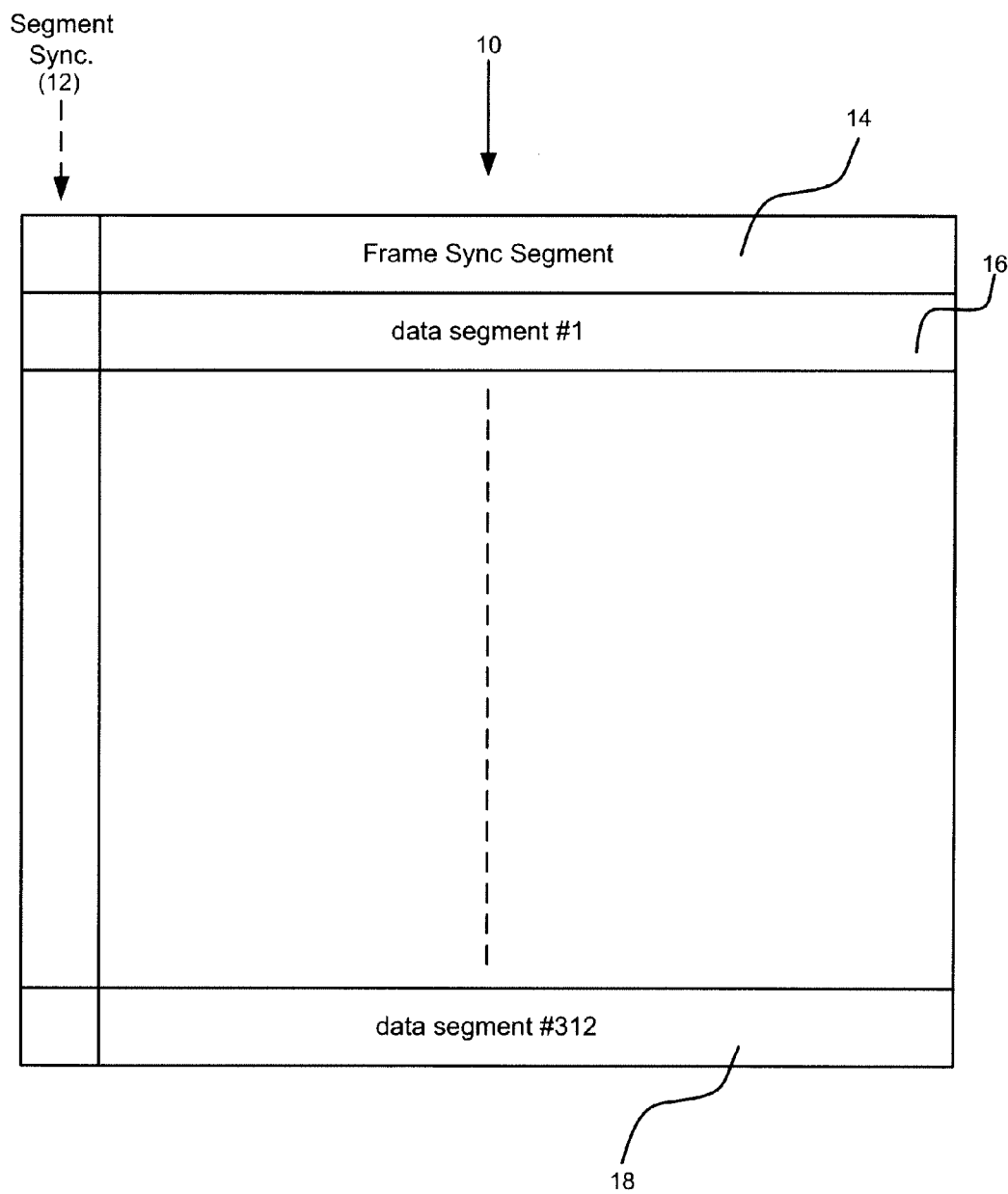
FIG. 1 is an example of a frame structure used in ATSC digital television.
Figure 2:
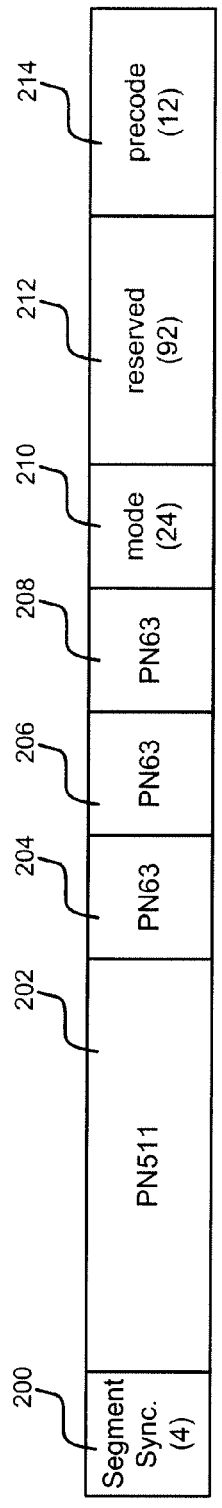
FIG. 2 is an example of a conventional frame synchronization packet.
Figure 3:
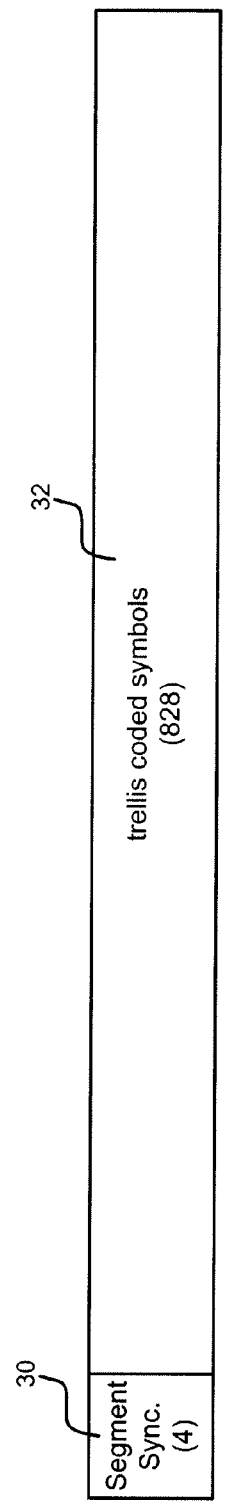
FIG. 3 is an example of a data segment in a conventional data frame.
Figure 4:
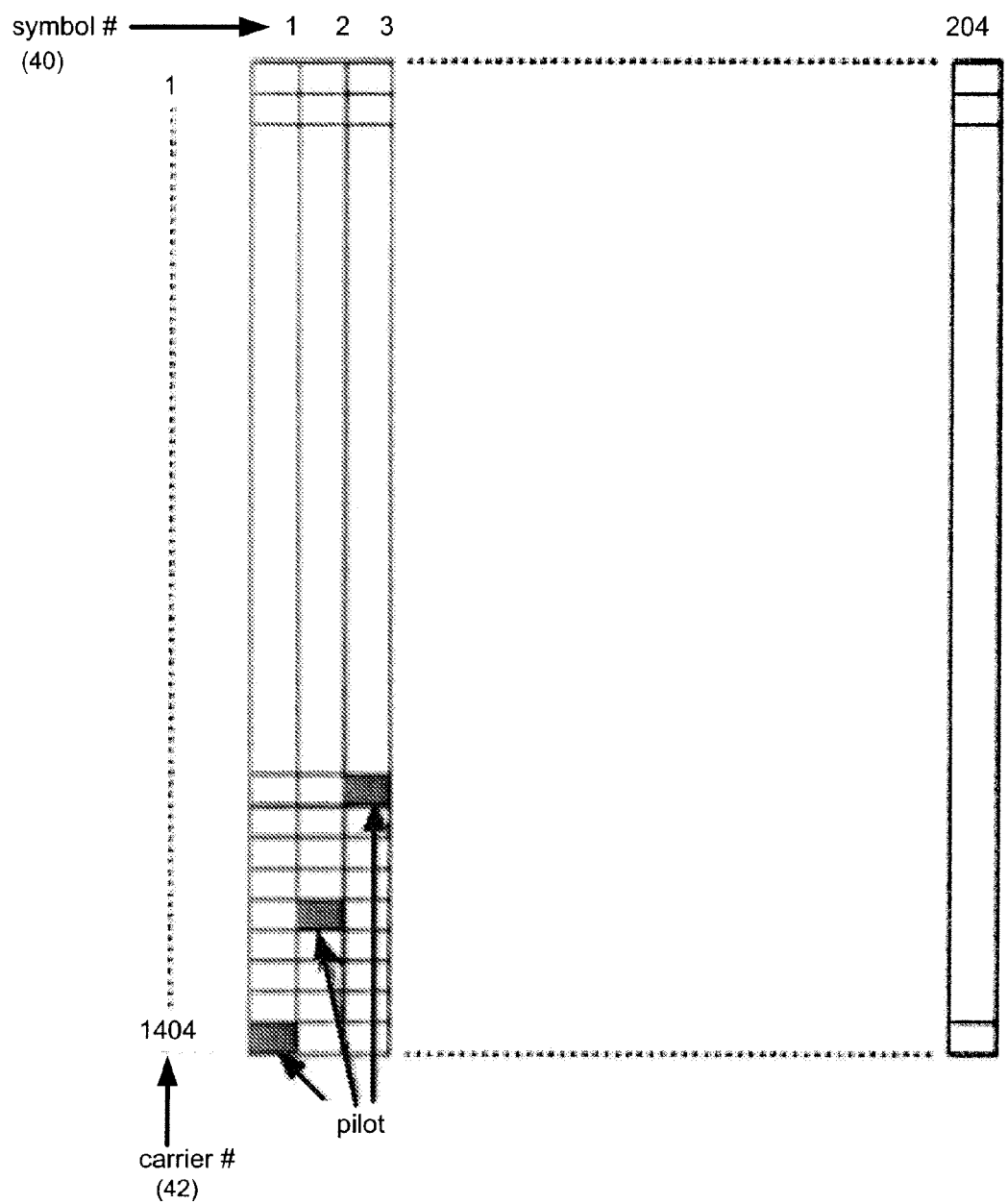
FIG. 4 provides a simplified view of a frame arrangement.
Figure 5:
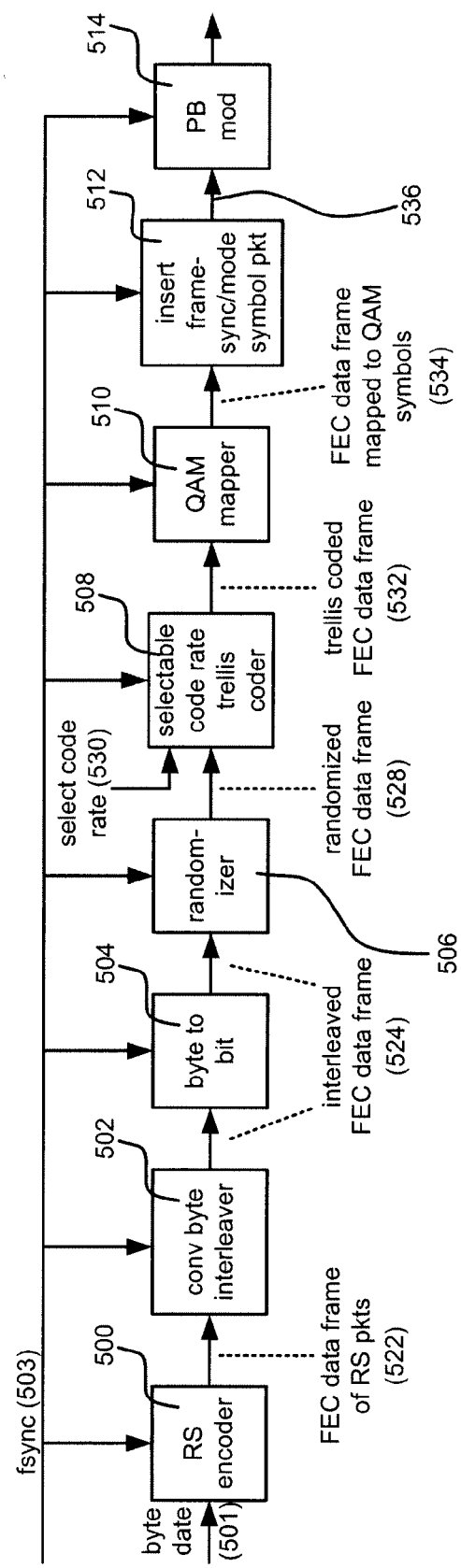
FIG. 5 is a block schematic of a modulator according to certain aspects of the invention.

Certain embodiments of the invention provide novel frame structures for a single carrier communication system. One frame structure according to certain aspects of the invention utilizes punctured trellis coding and QAM constellation combinations similar to those used in ISDB-T. As used herein, a constellation is a mapping in a complex plane of the possible symbols in a modulation scheme. The number of symbols per frame is a variable integer depending on the mode and the number of RS packets per frame is a constant integer regardless of mode. This arrangement simplifies the design of receiver processing blocks such as the de-randomizer and the de-interleaver because the number of RS packets per frame is always fixed. In conventional systems such as ISDB-T, the number of symbols per frame is constant and the number of RS packets per frame is a variable integer depending on the mode. The frame will be described with reference to an example depicted in FIG. 5 of a transmitter architecture that is constructed according to certain aspects of the invention.

An RS encoder 500 accepts byte data 501 and an externally generated frame sync signal that indicates the start of each group of 315 Reed-Solomon packets 522. As shown in FIG. 6, each packet 60 comprises 207 bytes, of which 20 are parity bytes 62. These 315 Reed-Solomon packets form forward error correction ("FEC") data frame 522 which contains 65205 bytes.

A convolutional byte interleaver 502 follows. FIG. 7 illustrates a mode of operation of interleaver 502 that combats impulse noise affecting the transmitted signal. The parameter B in paths 76, 78 is set to 207, and parameter M in paths 72, 74, 76 and 78 is set to 1. Frame sync signal 503 forces input and output commutators 70 and 71 to the top position 700, thus synchronizing the interleaving to the frame structure. Input and output commutators 70 and 71 move down one position 702 as a byte enters the interleaver and a different byte exits the interleaver. When commutators 70 and 71 reach the bottom 708, they shift back to the top 700. Each of the B parallel paths 706, 708 contains a shift register 76 and 78 having the length shown in the FIG. 7.

A randomizer 506 produces a randomized FEC data frame 528 by operating on the 65205×8=521640 bits of the FEC data frame 524 by executing an exclusive or operation on those bits with a PN (pseudo-random noise) sequence of length 2$^{19}$−1 which is shortened by resetting the PN sequence generator at every frame sync time.

Figure 8:
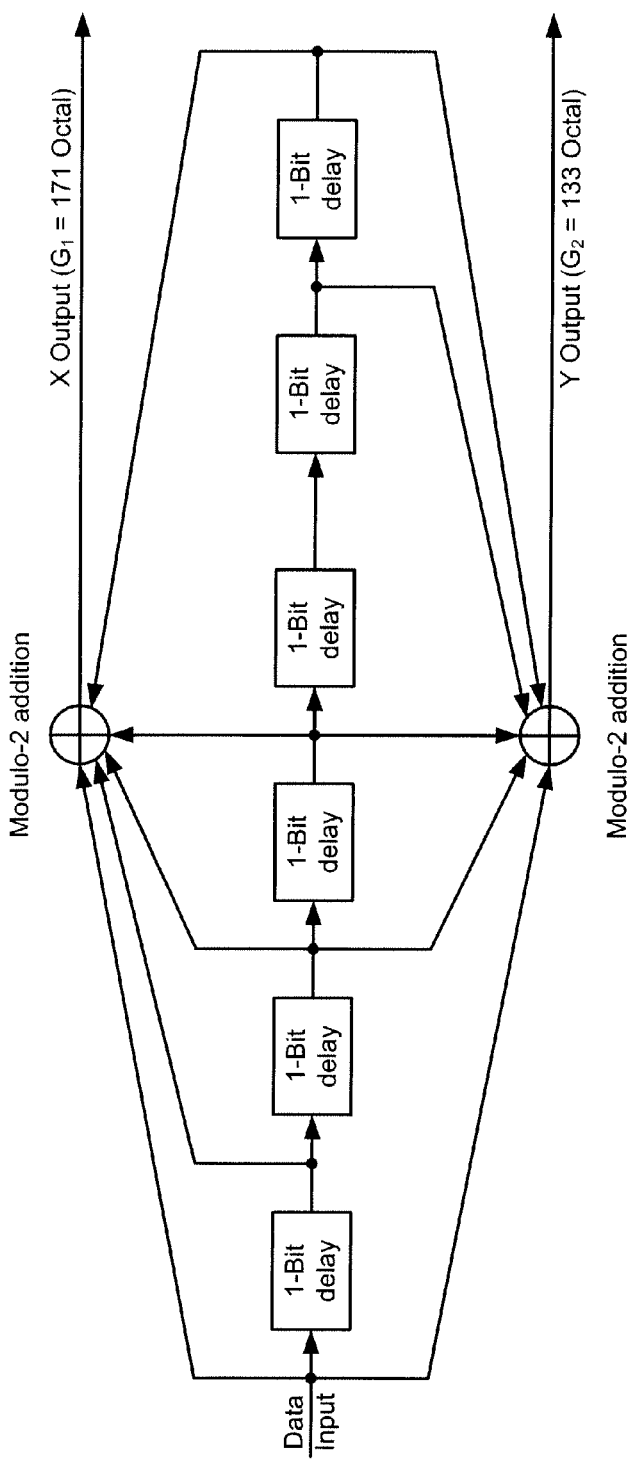
FIG. 8 is a block schematic of a selectable code rate punctured trellis coded modulation employed in certain embodiments of the invention.

Selectable code rate punctured trellis coded modulation ("PTCM") module 508 is shown in more detail in FIG. 8. PTCM 508 uses a method known to those of skill in the art. The method that starts with a 64 state ½ rate coder and executes puncturing to achieve any one of 5 different code rates. In certain embodiments, the PTCM 508 can also be completely bypassed (code rate=1). This allows for a selectable trade off between net bit rate and white noise performance for the system. Similar trellis coding techniques are used in ISDB-T and DVB-T systems. PTCM produces two bits 532 at the output for every bit provided to the input 528. However, some of the output bits 532 are discarded according to the selected code rate and corresponding puncture pattern.

QAM mapper 510 takes the bits in groups of 2, 4 or 6 from the coder output 532 and maps them into QPSK, 16 QAM, or 64 QAM symbols respectively. Examples of such mappings are provided in FIG. 9.

Figure 10:
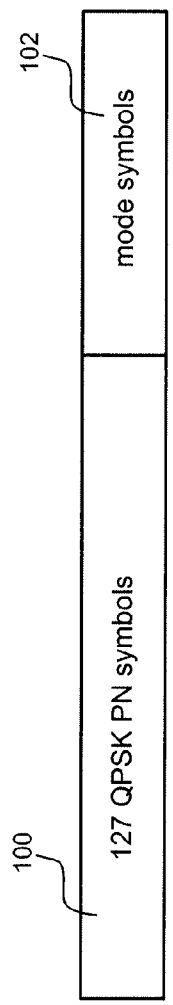
FIG. 10 shows a frame sync/mode packet.

Module 512 adds a frame-sync/mode symbol packet (all symbols are QPSK) to the start of each FEC data frame 534. With reference to FIG. 10, the first part 100 of this packet comprises 127 symbols and consists of an identical binary PN sequence for both the real and imaginary parts of the symbols. Other PN sequence lengths are possible, and the real and imaginary parts can have the opposite sign. The second part 102 of this packet consists of data that indicate the transmission mode—the selected QAM constellation and the selected trellis code rate. This mode data can be encoded using a block error correction code for added reliability at the receiver. Methods that can be employed include BCH coding and other block codes. In one example, 6 possible trellis code rates including bypass are possible. Additionally, three constellations are possible resulting in 18 modes. Accordingly, 5 bits are needed to represent each of the possible mode selections. The 5 bits could be encoded into a 16 bit code word using an extended BCH code. Since each QPSK symbol contains 2 bits, 8 mode symbols would be required.

Figure 11:
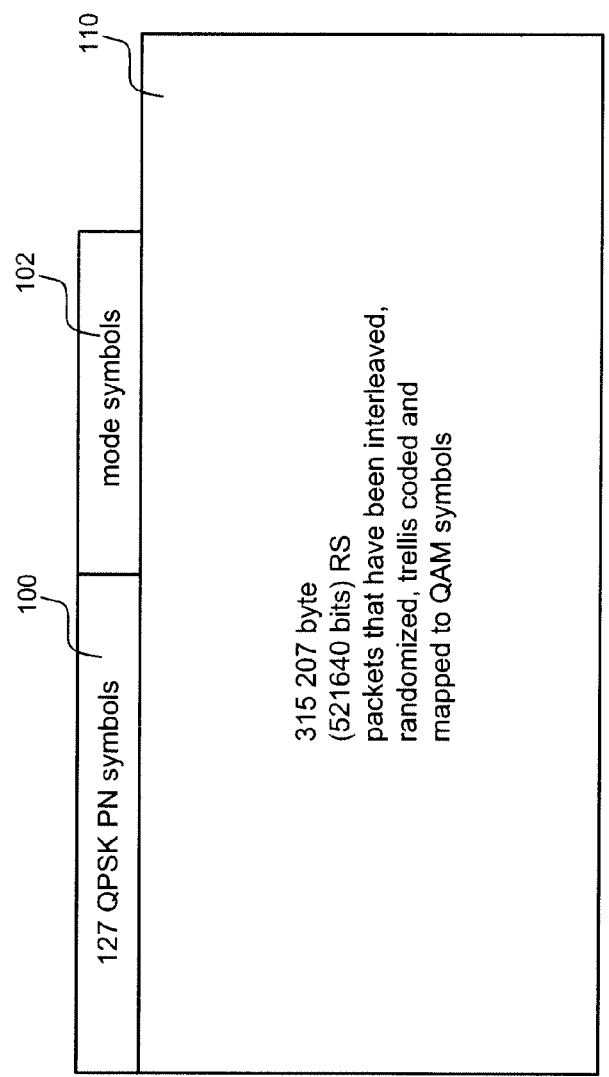
FIG. 11 is a simplified frame structure employed in certain embodiments of the invention.

FIG. 11 illustrates a frame structure 536 provided to passband modulation ("PB Mod") module 514. Packets 110 comprise 315 RS packets (521640 bits). The number of QAM symbols to which the 315 RS packets 110 are mapped can vary with the mode selection. The PB Mod module 514 then modulates the baseband QAM symbols to passband using any suitable method known to those with skill in the art.

Frame structures according to certain aspects of the invention advantageously overcomes certain shortcomings and failings of conventional frames. In particular, the frame structure offers for all modes:

a constant integral number of RS packets per frame regardless of mode, and the number of QAM symbols per frame is a variable integer for all modes an integral number of puncture pattern cycles per frame for all modes Note that providing an integer number of QAM symbols per frame is not a trivial accomplishment because the FEC data frame must exactly comprise I×207 data bytes where I is a selected integer in order to have a fixed integral number of RS packets per frame. Accordingly, the number of data bits per frame prior to trellis coding must not only be an integer, but the number must be evenly divisible by 207×8=1656 for all modes. Furthermore, the number of trellis coder output bits per QAM symbol is 2, 4 and 6 bits respectively for QPSK, 16 QAM and 64 QAM (See Table 2. which shows a code rate=1 for trellis code bypass). Additionally, trellis coding adds bits. The number of data bits per symbol prior to trellis coding is shown in Table 2, where each entry is calculated as:

TABLE 2

Data Bits per Symbol (input bits to trellis coder per mapped QAM symbol) right-most column entry/code rate

| constellation | trellis code rates | | | | | |
|---|---|---|---|---|---|---|
| | ½ | ⅔ | ¾ | ⅚ | ⅞ | 1 |
| QPSK | 1.00 | 4/3 | 1.50 | 5/3 | 1.75 | 2.00 |
| 16 QAM | 2.00 | 8/3 | 3.00 | 10/3 | 3.50 | 4.00 |
| 64 QAM | 3.00 | 4.00 | 4.50 | 5.00 | 5.25 | 6.00 |

The fact that the number of data bits per symbol can be fractional requires that the RS packet size and the number of RS packets per frame be precisely selected. With RS packet size of 207 and 315 packets per frame an integral numbers of symbols per frame is attained. As shown in table 3, each entry can be calculated as:

TABLE 3

Symbols per Frame
number of data bits per frame/number of data bits per symbol = 521640/entry from table 2

| constellation | trellis code rates | | | | | |
|---|---|---|---|---|---|---|
| | ½ | ⅔ | ¾ | ⅚ | ⅞ | 1 |
| QPSK | 521640 | 391230 | 347760 | 312984 | 298080 | 260820 |
| 16 QAM | 260820 | 195615 | 173880 | 156492 | 149040 | 130410 |
| 64 QAM | 173880 | 130410 | 115920 | 104328 | 99360 | 86940 |

This frame provides the additional advantage that there are an integral number of puncture pattern cycles per frame (pp/frame) for all modes. In order to correctly decode the punctured trellis coded data, the decoder in the receiver must know how the puncture pattern aligns with the data. The bit-wise puncture patterns applied at the output of the mother code trellis coder are indicated in the second column of the table in FIG. 8. The number of 1's in each puncture pattern is the puncture pattern length. In the proposed system the puncture pattern always lines up with the start of the FEC data frame. This allows the use of frame sync in the receiver to properly align the de-puncturer in the receiver Viterbi decoder with the bit stream. The desired alignment is indicated in Table 4 which shows an integral number of pp/frame for all modes. The puncture pattern per symbol ("pp/symbol") entries can be calculated as:

*pp* length/# of trellis coder output bits per symbol

The pp/frame entries can be calculated as:

TABLE 4

Puncture Patterns per Frame
symbols per frame from table 3/pp/symbol

| code rate | pp length | QPSK (2 bits/sym) pp/symbol | pp/frame | 16 QAM (4 bits/sym) pp/symbol | pp/frame | 64 QAM (6 bits/sym) pp/symbol | pp/frame |
|---|---|---|---|---|---|---|---|
| 1/2 | 2 | 1 | 521640 | 2 | 521640 | 3 | 521640 |
| 2/3 | 3 | 2/3 | 260820 | 4/3 | 260820 | 2 | 260820 |
| 3/4 | 4 | 1/2 | 173880 | 1 | 173880 | 3/2 | 173880 |
| 5/6 | 5 | 1/3 | 104328 | 2/3 | 104328 | 1 | 104328 |
| 7/8 | 8 | 1/4 | 74520 | 1/2 | 74520 | 3/4 | 74520 |
| 1 | NA | NA | NA | NA | NA | NA | NA |

It will be appreciated that other combinations of RS packet sizes and numbers of packets per frame can be used to obtain the same desired result. The numbers provided herein are described for purposes of illustration only.

Figure 12:
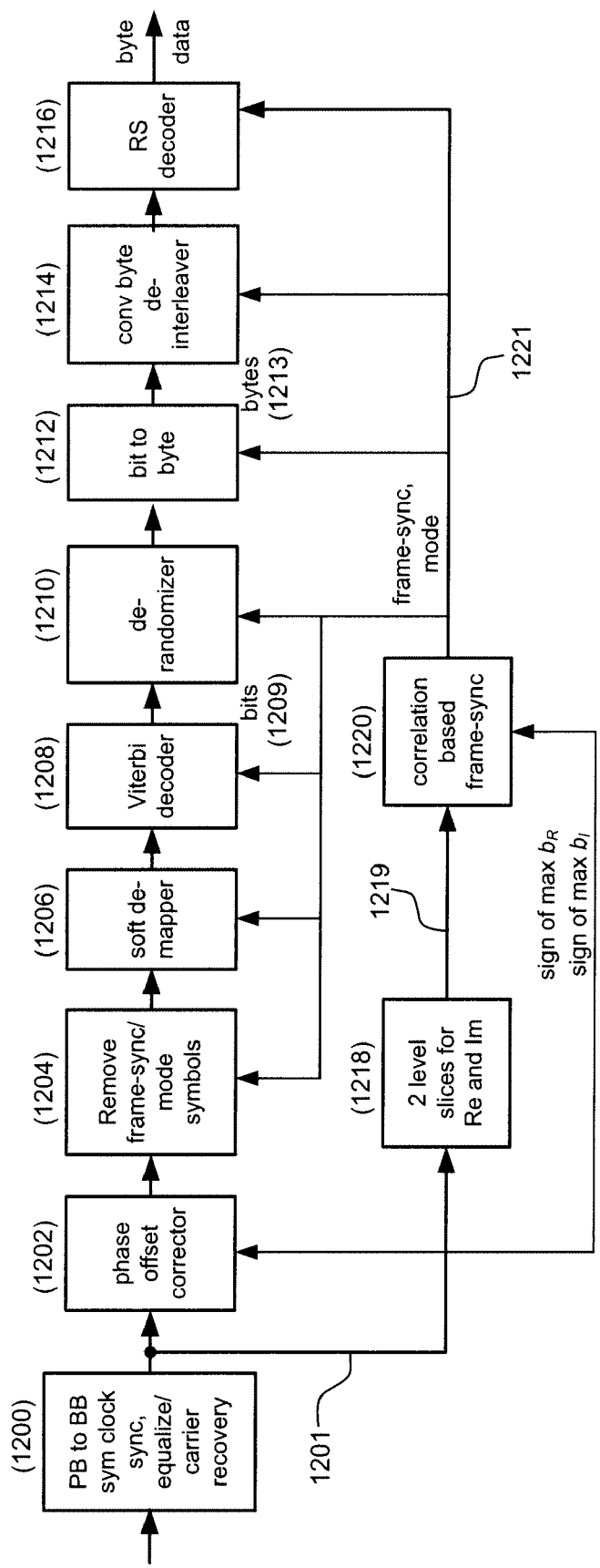
FIG. 12 is a block schematic of a demodulator according to certain aspects of the invention.

As shown in FIG. 12, certain embodiments of the invention provide a receiver architected to handle a frame structured according to certain aspects of the invention. Module 1200 receives and converts transmitted data in a passband signal to baseband QAM symbols. The operations performed by module 1200 can include symbol clock synchronization, equalization (to remove inter-symbol interference) and carrier recovery, typically using sub-modules. Accordingly, module 1200 may comprise an equalizer that outputs recovered baseband QAM symbols 1201. Baseband QAM signals 1201 are provided to two-level slicer 1218 for slicing in both the real and imaginary directions, thereby forming the $a_R[k] \in [-1,+1]$ and $a_I[k] \in [-1,+1]$ sequences 1219 which are provided to frame-sync module 1220.

Frame sync module 1220 performs a continuous cross-correlation operation on the incoming sliced QAM symbols 1219, separately for both the real and imaginary parts, with a stored copy of the binary frame-sync PN sequence. Each member of the stored copy has a value of −1 or +1. This operation is given by:

$$b_R[k] = \sum_{n=0}^{126} s[n] a_R[n-k] \text{ and } b_I[k] = \sum_{n=0}^{126} s[n] a_I[n-k], \quad \text{eq. 1}$$

where s is the stored copy in the 127 long frame-sync PN sequence. The maximum magnitude of either $b_R$ or $b_I$ indicates the start of the FEC data frame.

Figures 13, 14:
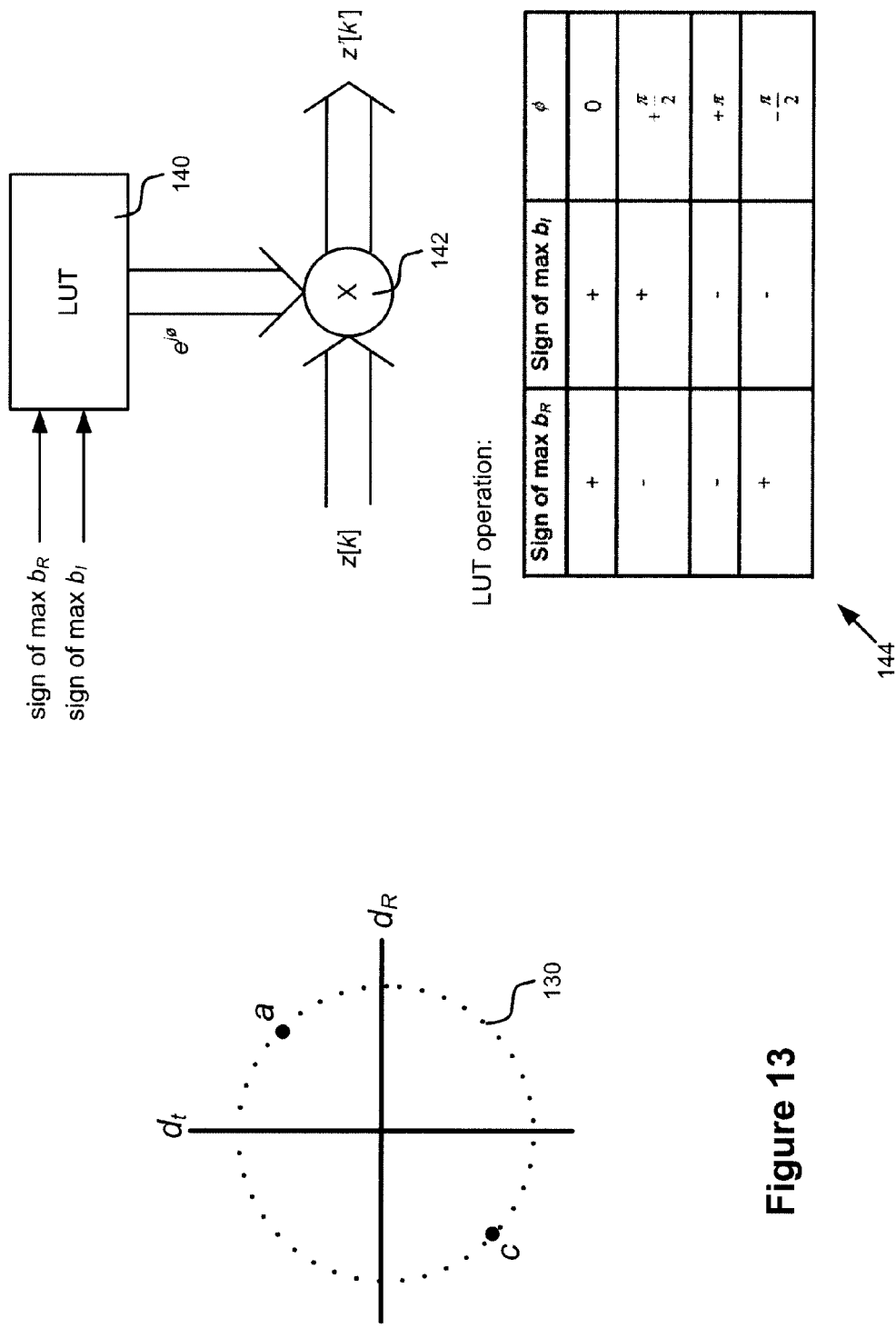
FIG. 13 illustrates a transmitted constellation.
FIG. 14 is a simplified block schematic of a phase offset corrector employed in certain embodiments of the invention.

As will be explained in more detail below, there is a $2/\pi$ ambiguity in the recovered carrier phase. This results in an arbitrary additional recovered phase offset of zero, $\pm 2/\pi$, or $\pi$. For the frame sync symbols, the real and imaginary parts are the same sign, so for them the transmitted constellation is as shown in FIG. 13. Thus, it will be appreciated that, for zero phase offset, the signs of the maximum magnitude $b_R$ and $b_I$ are both positive. As summarized in Table 5, a $-\pi/2$ offset will yield a negative maximum magnitude $b_R$ and a positive maximum magnitude $b_I$; for an offset of $\pi$, both $b_R$ and $b_I$ will be negative, and for an offset of $\pi/2$, the maximum magnitude $b_R$ will be positive and the maximum magnitude $b_I$ will be negative.

TABLE 5

| Sign of max $b_R$ | Sign of max $b_I$ | Phase Correction Needed |
|---|---|---|
| + | + | 0 |
| − | + | $+\pi/2$ |
| − | − | $+\pi$ |
| + | − | $-\pi/2$ |

Thus, the respective signs of the maximum magnitude $b_R$ and $b_I$ in combination can indicate the quadrant of the complex plane to which the final phase offset has converged. This permits an additional phase correction to be applied to the signal in phase offset corrector module 1202. The signs of the maximum $b_R$ and $b_I$ may be sent from the correlation based frame-sync module 1220 to the phase offset corrector 1202.

With reference also to FIG. 14, the operation of certain aspects of phase offset corrector 1202 in the example of FIG. 12 can be better understood. LUT 140 generates an output based on the signs of the maximum magnitude $b_R$ and $b_I$ (see Table 5 and element 144 of FIG. 14). Given that $z[k]=z_R[k]+jz_I[k]$, operation 142 can be executed as follows:

1) For the case of $\phi = +\pi$: $z'[k] = -z_R[k] - jz_I[k]$

2) For the case of $\phi = +\frac{\pi}{2}$: $z'[k] = -z_I[k] + jz_R[k]$

3) For the case of $\phi = -\frac{\pi}{2}$: $z'[k] = +z_I[k] - jz_R[k]$

Figure 15:
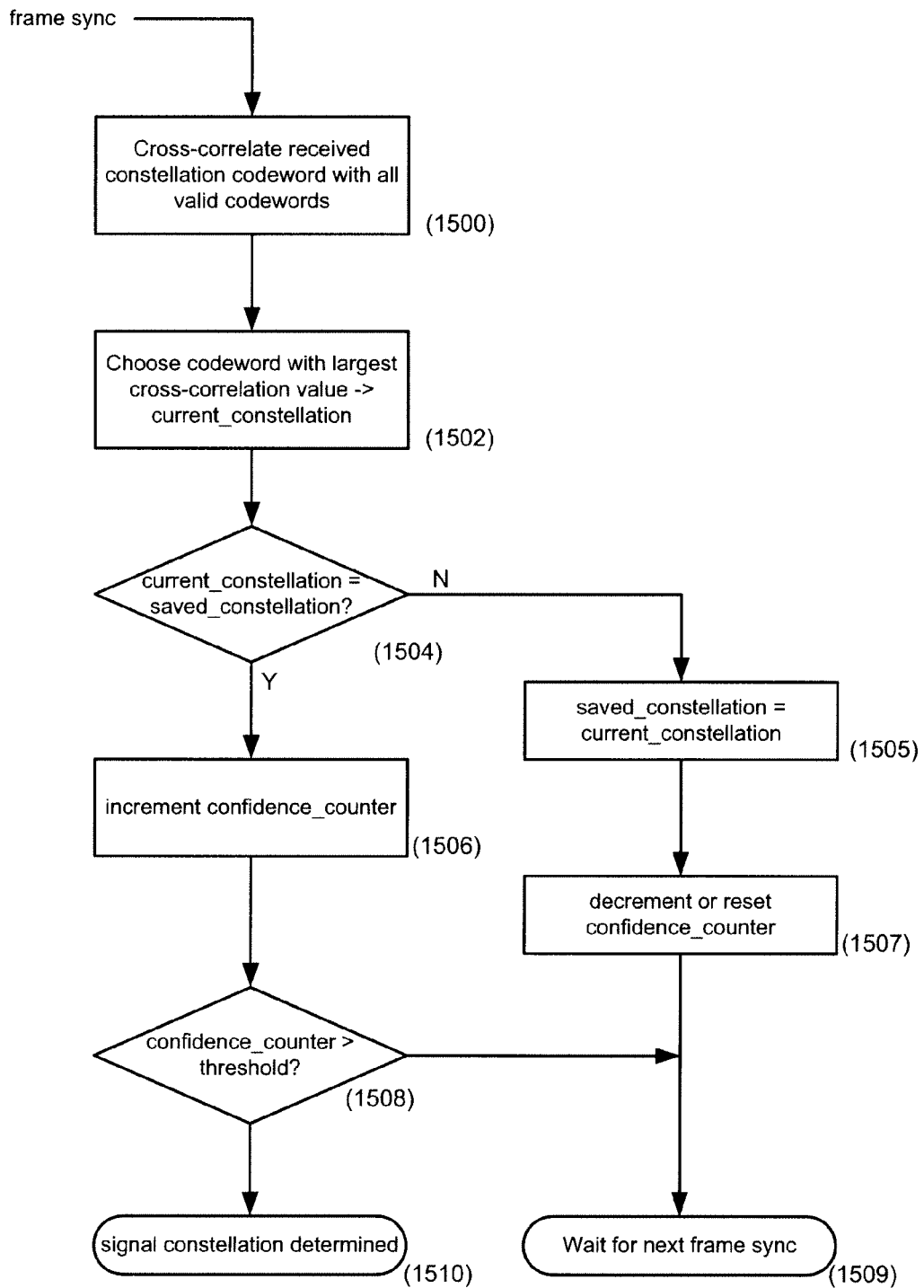
FIG. 15 illustrates a process for determining reliability related to frame synchronization.

Once the frame sync start position is located and the $m\pi/2$ phase offset corrected, the position of the code words containing the mode bits (constellation and trellis code rate) is known. The code words can then be reliably decoded by, for example, a BCH decoder or by correlating the received code word with all the possible code words and choosing the code word yielding the highest resulting value. Since this information is sent repeatedly, additional reliability can be obtained by requiring that the same result occur multiple times before it is accepted. FIG. 15 shows an example of such a process that can be performed by frame-sync module 1220.

Responsive to frame-sync signal 1221, at step 1500, received constellation code words are cross-correlated with all valid code words. Cross-correlation yields a value that can be used to select a most likely match. In one example, the valid code word that produces the largest correlation value is selected at step 1502. This chosen code word can then be used to identify a current constellation. At step 1504, the identity of the current constellation is compared with the recorded or otherwise stored identity of a previously identified constellation. If, at step 1504, the current constellation and previously identified constellation are the same constellation, then a confidence counter can be incremented. If the previously identified constellation is determined at step 1504 to be different not the current constellation, then the current constellation is recorded as the previously identified constellation at step 1507 and the confidence counter is decremented at step 1507 and another sync frame is awaited at step 1509. Following the step 1506 increment of confidence counter the confidence counter is examined at step 1508 and, if determined to have exceeded a predetermined or configured threshold value at step 1508, then the determination of signal constellation may be made at step 1510. Iterations of this process may be performed until the confidence counter exceeds the predetermined or configured threshold value.

Continuing with the system of FIG. 12, frame-sync signal 1221 output from the frame-sync module 1220 can be used to indicate which symbols are to be removed in module 1204 before symbols are fed to the soft de-mapper. In one example, 127 frame-sync symbols and 8 mode symbols are removed from the stream ensuring that only symbols corresponding to the RS packets are passed to soft de-mapper 1206. Soft de-mapper 1206 calculates soft bit metrics using algorithms that are known in the art including, for example, algorithms described by Akay and Tosato. For correct operation, soft de-mapper 1206 must know which puncture pattern (which trellis code rate) was used in the transmitter and also the alignment of that pattern with the received bits. This information 1221 is provided by frame-sync module 1220 which decodes the mode information and also provides a repeating frame sync signal to which the puncture pattern is aligned, regardless of the current mode. These soft bit metrics are fed to Viterbi decoder 1208 that operates in a manner known in the art to arrive at estimates of the bits that were input to the PTCM encoder in the transmitter.

De-randomizer 1210, byte de-interleaver 1214, and RS decoder 1216, which are all synchronized by the frame-sync signal 1221, respectively de-randomize, de-interleave, and decode the byte data to obtain the data that originally entered the RS encoder in the transmitter.

Baseband to Passband Modulation

Figure 16:
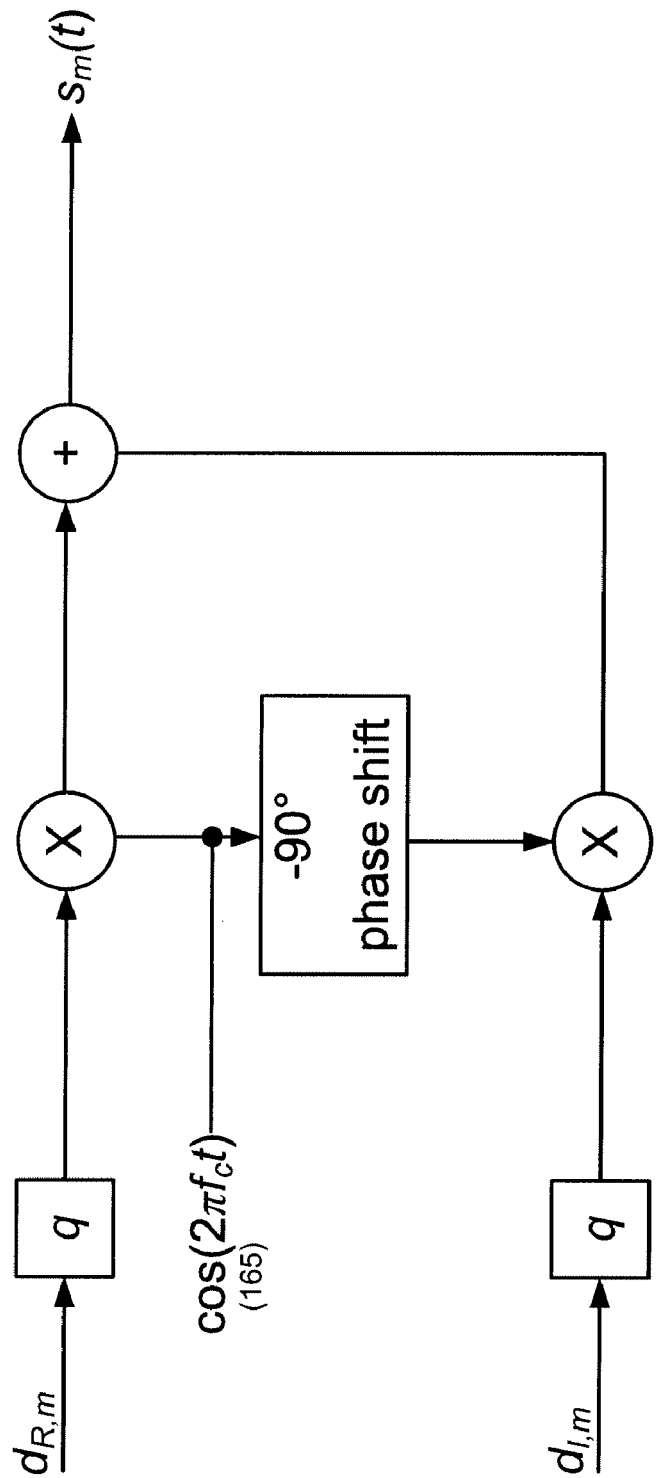
FIG. 16 depicts a simple QAM modulator employed in certain embodiments of the invention.

Certain wireless digital communication systems, including broadcast, wireless LAN, and wide area mobile systems, employ QAM in some form. QAM is also used in both the North American and European digital cable television standards using quadrature-carrier multiplexing that enables two double-side-band suppressed-carrier modulated waves to occupy the same channel bandwidth, with each wave modulated by an independent message. FIG. 16 depicts a simple QAM modulator that may serve as PB mod 514 in the example of FIG. 5. An isolated transmitted QAM pulse is given by:

$$s_m(t) = d_{R,m} q(t) \cos(2\pi f_c t) - d_{I,m} q(t) \sin(2\pi f_c t) = Re\{d_m q(t) e^{j2\pi f_c t}\},$$

where $d_{R,m}$ and $d_{I,m}$ are determined by two independent message streams and represent the real and imaginary parts respectively of a complex QAM symbol (see, e.g., FIG. 9), with m=1 . . . M indexing a 2-dimensional QAM constellation of cardinality where M is the modulating carrier frequency, and q(t) is a root raised cosine pulse function.

A continuous series of transmitted QAM pulses s(t), at a rate of $F_s=1/T_s$, passes through a noisy multipath channel. Thus, the received signal at the input to the QAM receiver is given by r(t)=s(t)*c(t)+v(t), where * denotes convolution, c(t) is the channel impulse response, and v(t) is additive white Gaussian noise.

Thus, $$r(t) = Re\left\{ e^{j2\pi(f_{LO}+f_o)t+\theta_o} \sum_{n=-\infty}^{+\infty} [d[n] * q(t)] c(t-nT_s) \right\} + v(t),$$

where d[n] is the complex transmitted symbol, $f_o$ and $\theta_o$ are the frequency and phase offsets respectively of the receiver passband to baseband demodulator local oscillator with respect to the transmitter, such that $f_{LO}=f_c-f_0$.

Passband to Baseband Demodulator

Figure 17:
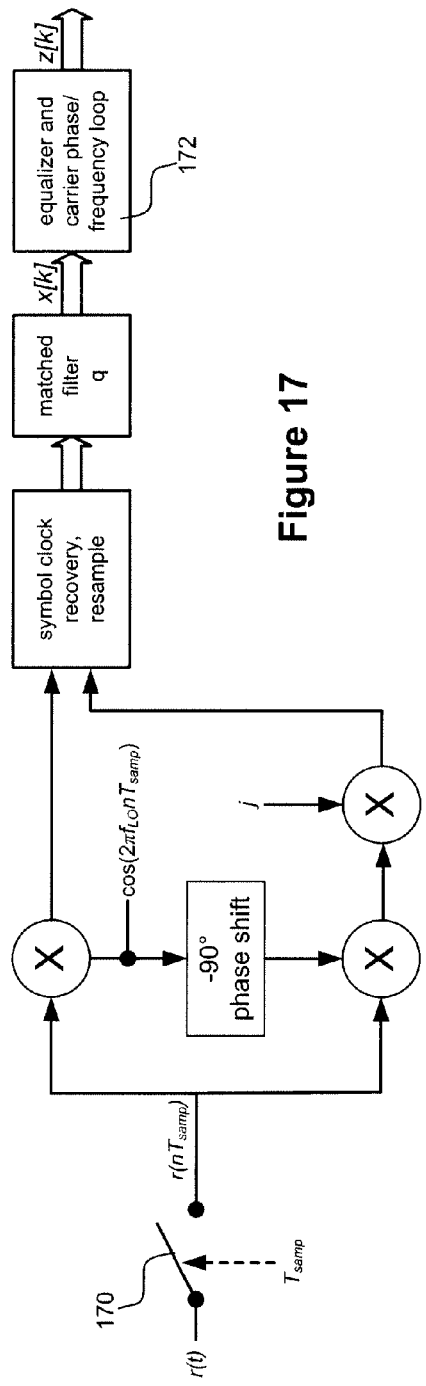
FIG. 17 shows a clock sync and equalizer/carrier recovery module employed in certain embodiments of the invention.

FIG. 17 shows the PB to BB, sym clock sync, equalizer/carrier recovery module 1200 of FIG. 12 in more detail. The received signal r(t)—observed at the output of a coax cable, for example—is sampled 170 at a rate higher than the symbol rate, resulting in the sampled signal $r(nT_{samp})$. After sampling:

$$r(nT_{samp}) = Re\left\{ e^{j2\pi(f_{LO}+f_o)nT_{samp}+\theta_o} \sum_{m=-\infty}^{+\infty} \begin{bmatrix} d[m] * \\ q(nT_{samp}) \end{bmatrix} c(nT_{samp} - mT_s) \right\} + v(nT_{samp}).$$

Then, after downconversion, resampling at the symbol rate $1/T_s$ and matched filtering obtains:

$$x(kT_s) = x[k] = e^{j2\pi f_o kT_s = \theta_o} \sum_{m=1\infty}^{+\infty} d[m]c[k-m] + v'[k],$$

where v'[k] is sampled complex filtered noise.

This assumes that due to the pulse shaping and matched filtering q, combined with perfect symbol rate sample timing, any ISI is due only to the channel impulse response c.

Equalizer and Carrier Phase/Frequency Loop

Figure 18:
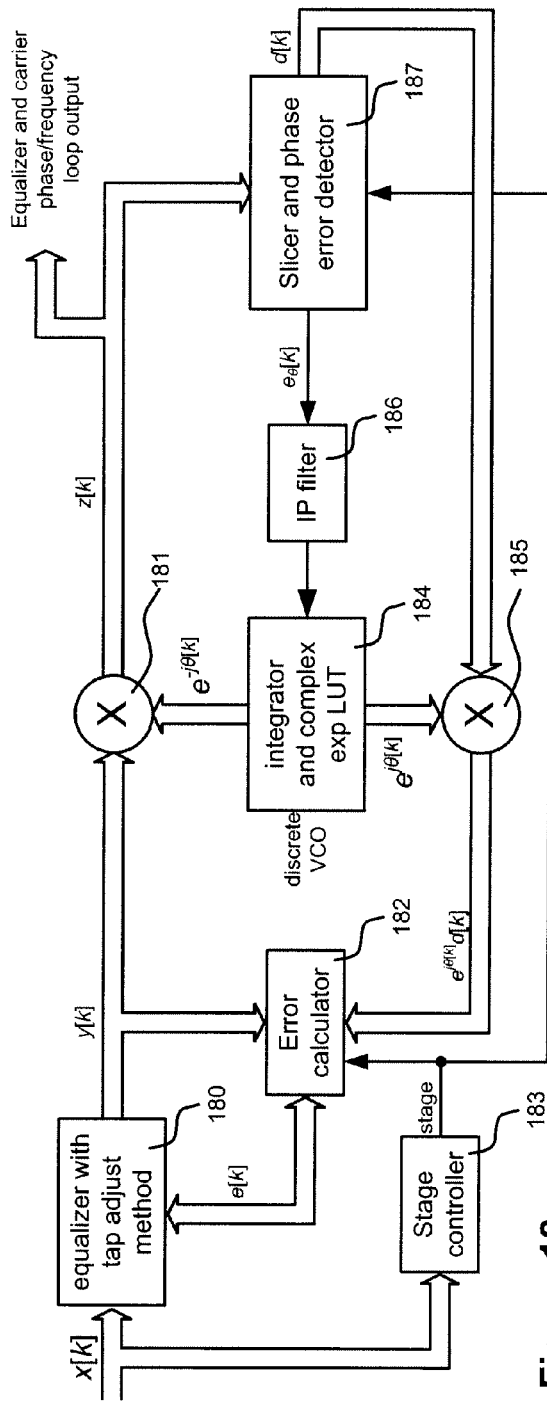
FIG. 18 illustrates certain aspects of an equalizer and carrier phase/frequency loop employed in certain embodiments of the invention.

With reference to FIG. 18, certain aspects of the equalizer and carrier phase/frequency loop 172 of FIG. 17 will be described. A signal x[k] enters the digital equalizer and carrier phase/frequency loop 172, which can include an equalizer 180 that includes a linear digital filter. An error calculator module 182 calculates an error signal e[k], which can be used to calculate an updated set of filter tap weights using any suitable method known to those with skill in the art. In one example, an LMS algorithm may be used. The filter removes the ISI caused by the channel impulse response, c. An output of equalizer 180 y[k] is then phase rotated at 181 in order to reduce any remaining carrier phase and frequency offset. The phase rotated output z[k] is then processed by slicer and phase error detector module 187 which calculates a phase error value $e_\theta[k]$ that feeds an integral-proportional (IP) filter 186. IP filter 186 output feeds an integrator and complex exponential look up table ("LUT") 184 which calculates complex exponential values used in the loop to correct the carrier phase and frequency offset. Slicer and phase error detector module 187 also outputs a nearest neighbor 2-dimensional sliced symbol decision whose phase is "un-corrected" by multiplication with $e^{+j\theta[k]}$ at 185 and then used in error calculator module 182. Error calculator module 182 utilizes that input as well as x[k] to calculate an error signal e[k]. As depicted, the internal operations of the error calculator module 182 and slicer and phase error detector module 187 depend on a current stage of operation (1, 2 or 3) that is determined by stage controller 183.

In certain embodiments, a least mean squares ("LMS") algorithm is used for calculating equalizer filter tap weights and operates as follows:
let x[k] represent an L long equalizer input vector, y[k] represents the equalizer output vector, where y[k]=$g^H$[k]x[k], where $g^H$[k] is the L long linear equalizer tap weight vector and the H superscript indicates conjugate transposition (Hermitian). Then, calculate updated e[k] in the error calculator module 182 using, for example, the methods described below:

$$g[k+1]=g[k]-2\mu x[k]e^*[k], \quad \text{eq. 2}$$

where μ is a small step size parameter and the * superscript indicates complex conjugation.

In the example, the stage controller 183 takes the equalizer and carrier phase/frequency loop 178 through three stages of operation, whereby switching from stage 1 to stage 2 to stage 3 is executed based on simple count thresholds of input data samples x[k]. Note that more complicated stage switching based on estimates of error at the equalizer output are also possible. The three stages are summarized in Table 6.

TABLE 6

Equalizer and Carrier Phase/Frequency Loop Stages

| Stage | $e_\theta$[k] calc. method | e[k] calc. method | State of freq./ phase recovery |
|---|---|---|---|
| 1 | CMA | Always zero | Constellation spinning |
| 2 | CMA | Based on reduced constellation (RCCR) | Phase/freq. gradually recovered |
| 3 | DD | Based on full constellation | Phase noise reduced |

Figure 19:
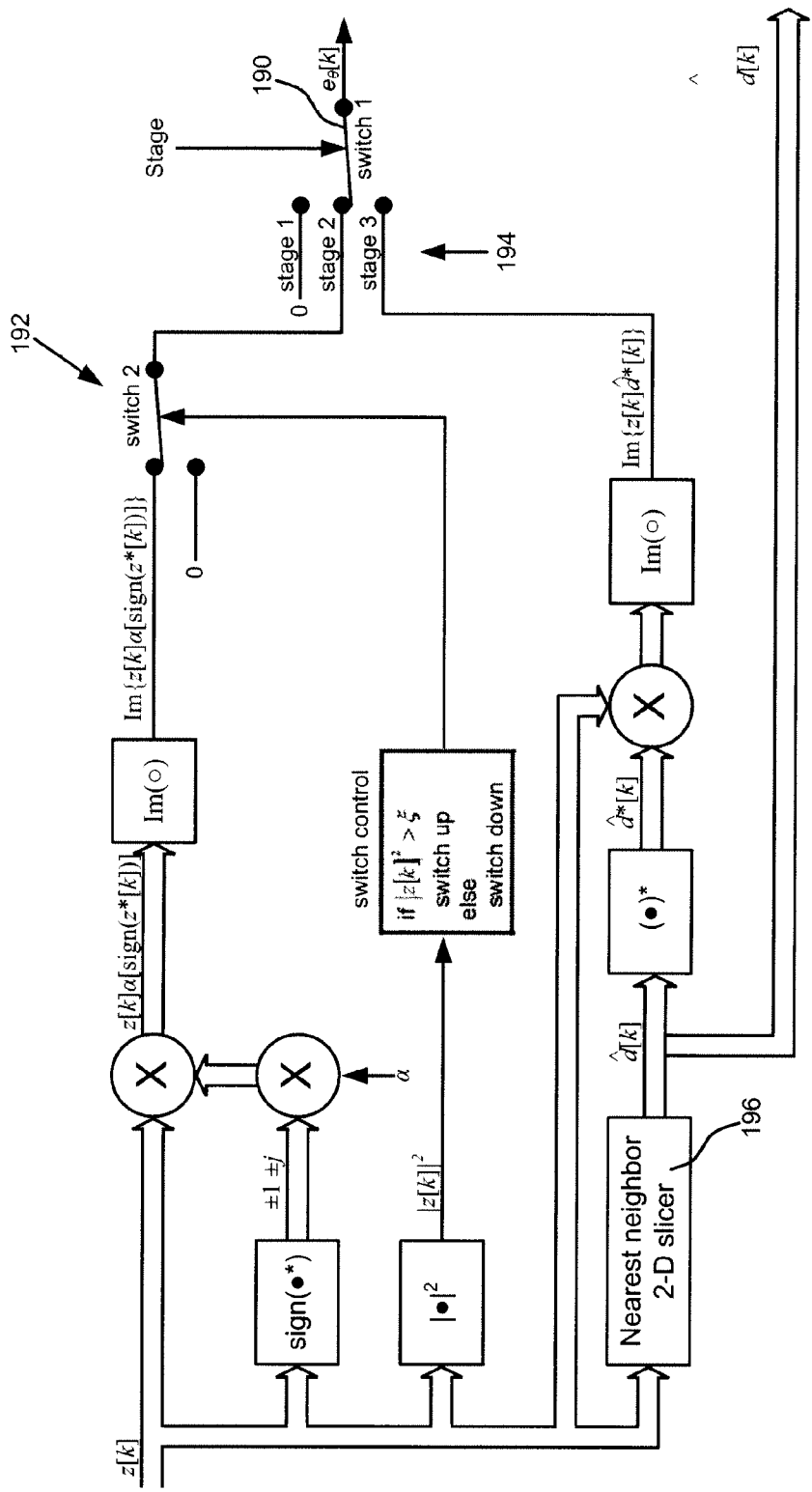
FIG. 19 shows a slicer and phase error detector module employed in certain embodiments of the invention.

A slicer and phase error detector module 187 is shown in more detail in FIG. 19. Switch 190 is set according to one of three stages 194 of operation. During stage 1, switch 190 is in the topmost position so that $e_\theta$[k]=0. This effectively turns off the carrier loop so that there is no carrier phase correction during this stage. During stage 2, switch 190 is in the middle position and the loop operates using a reduced constellation carrier recovery (RCCR) algorithm. If the power of the symbol z[k] given by |z[k]|² exceeds a threshold ξ, then it is presumed that z[k] is one of the corner symbols of the constellation and RCCR is enabled by setting depicted second switch 192 to upper position, yielding $e_\theta$[k]=Im{z[k]α⌊sign(z*[k])]}. Otherwise, if ξ≦2|[kz|z[k]|²≦ξ, second switch 192 is in the lower depicted position disabling the carrier loop. Thus only a subset of the symbols can contribute to carrier recovery during stage 2. The threshold ξ can be reduced to include more symbols in the regions near the constellation corners, but the resultant phase correction term $e_\theta$[k] will be noisier. During stage 3, switch 190 is in the lowest depicted position, yielding $e_\theta$[k]=Im{z[k]$\hat{d}$*[k]}, where $\hat{d}$*[k] is the complex conjugate of the nearest neighbor 2-dimensional sliced symbol decision $\hat{d}$[k]. During stage 3, it is presumed that enough time has passed so that the equalizer taps have converged and the carrier phase has been substantially corrected such that the sliced symbol decisions are reliable.

Notably, the relations $e_\theta$[k]=Im{z[k]α⌊sign(z*[k])]} and $e_\theta$[k]=Im{z[k]$\hat{d}$*[k]} effectively operate within a single quadrant of the complex plane. This results in an mπ/2 ambiguity in recovered carrier phase as discussed above.

Figure 20:
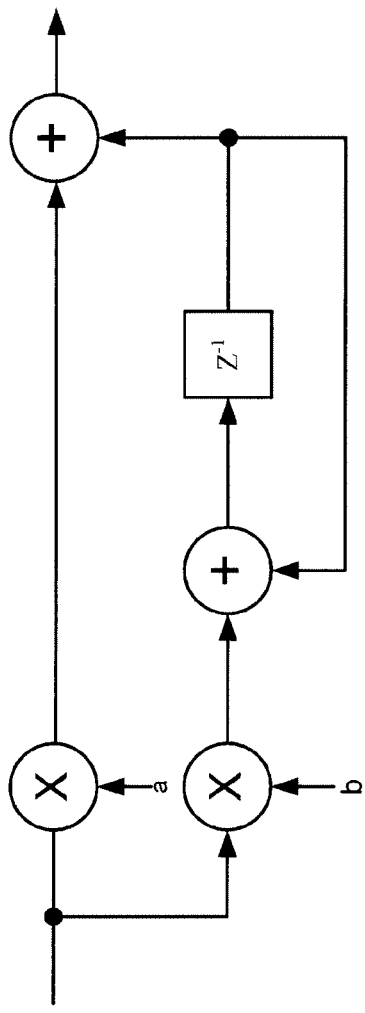
FIG. 20 shows an IP filter employed in certain embodiments of the invention.
Figure 21:
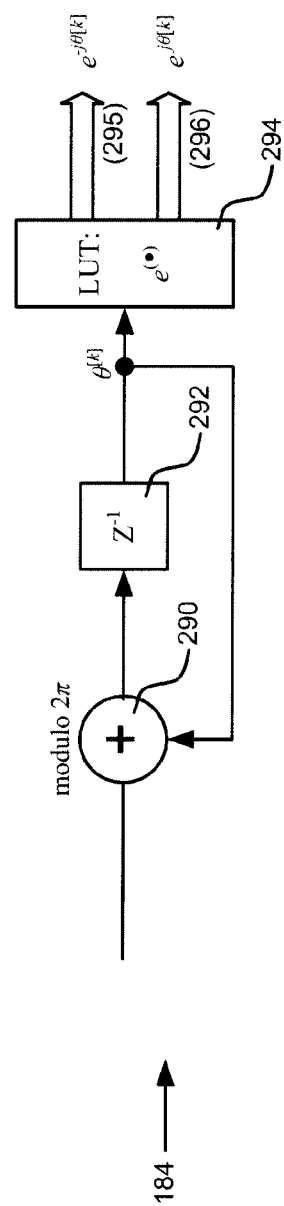
FIG. 21 illustrates a complex exponential LUT module employed in certain embodiments of the invention.

An example of an IP filter 186 (see FIG. 18) is shown in more detail in FIG. 20. IP filter 186 allows the loop to correct both phase and frequency offsets. The output of the IP filter 186 feeds the integrator and complex exponential LUT module 184, shown in more detail in FIG. 21. The input of integrator/LUT 184 is modulo 2π added 290 to a one step delayed 292 version of the input to form a phase error signal θ[k] which is fed to a lookup table (LUT) 294 that outputs phase correction factor 295 ($e^{-j\theta[k]}$) that corrects for both $\theta_o$ and $f_o$. LUT 294 also provides an output 296 ($e^{+j\theta[k]}$) that "un-corrects" the slicer output $\hat{d}$[k] so that it can be used derive an error signal for the equalizer tap update. This is needed because the equalizer operates on x[k] which contains both $\theta_o$ and $f_o$.

Error Calculator Module and Stage Operation Summary

Figure 9:
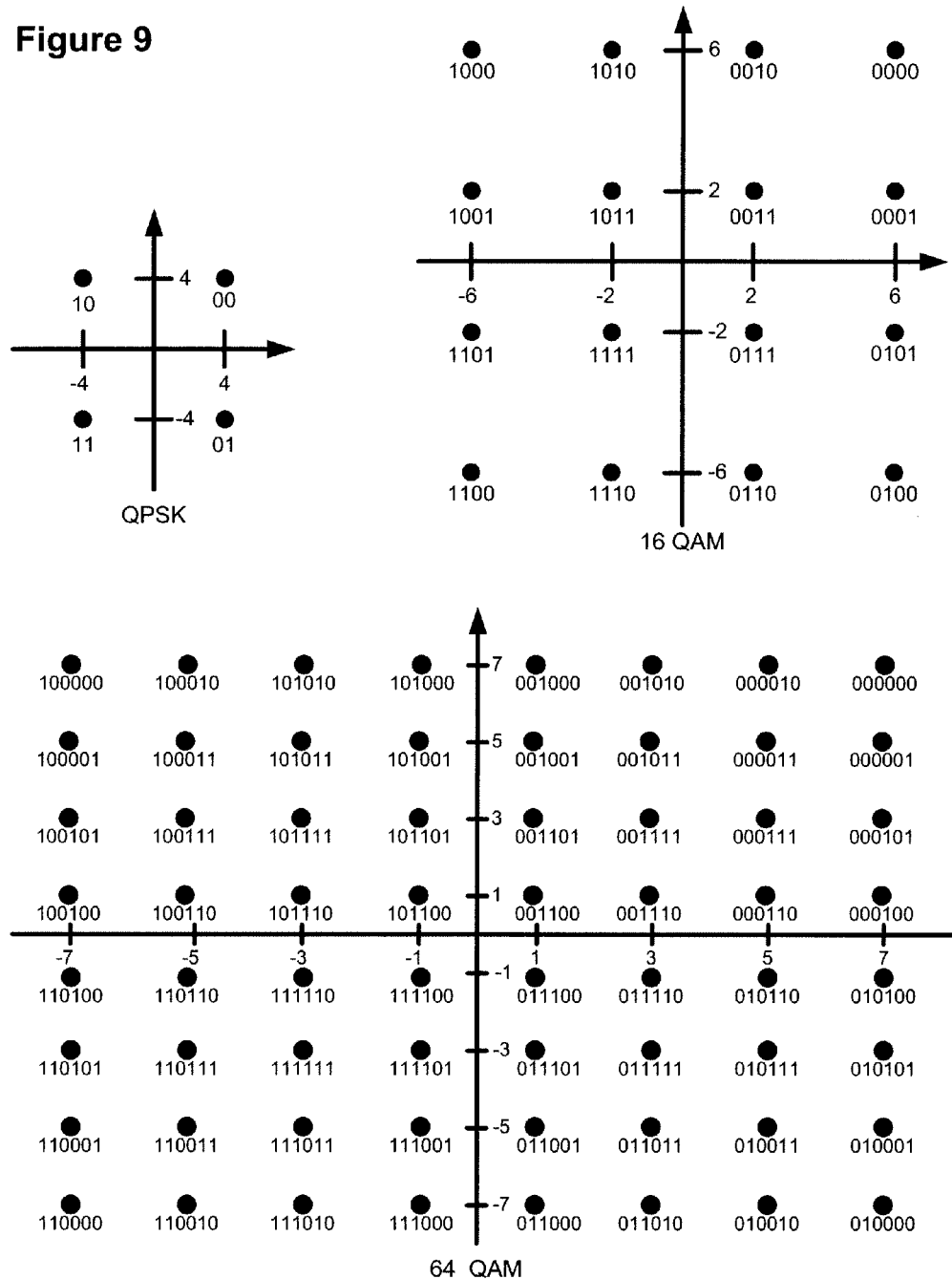
FIG. 9 illustrates examples of QAM mappings.

Error calculator 182 can employ different methods for calculating e[k] depending on the stage. For stages 1 and 2, e[k] is typically calculated using a process based on a constant modulus algorithm (CMA):

$$e[k]=y[k](|y[k]|^2-R),$$

where R is a pre-determined constant given by:

$$R = \frac{E\{|d[k]|^4\}}{E\{|d[k]|^2\}}, \quad \text{eq. 3}$$

and where E is the expectation operator and d[k] is a symbol from FIG. 9.

Note that this e[k], which drives the tap update of eq. 2 above, is independent of symbol decisions and the phase of x[k] and depends only on the equalizer output, the equalizer input, and the statistics of the constellation. It can be shown that during stages 1 and 2, the use of the CMA error to drive eq. 2 is equivalent to minimizing the ISI, even though the constellation is spinning due to the carrier frequency and phase offsets.

Thus, during stage 1, the phase/frequency recovery loop is disabled, and the equalizer minimizes the ISI using the CMA error function. After the ISI has been minimized, stage 2 begins and the loop is turned on for RCCR; carrier phase/frequency recovery begins using only the corner symbols of the constellation, as previously explained in relation to FIG. 19. At the end of stage 2, carrier phase and frequency have been recovered sufficiently so that the 2-dimensional slicer 196 of FIG. 19 begins to output reliable symbol decisions $\hat{d}$[k].

Decision directed (DD) error may be used in stage 3. The DD error may be calculated as e[k]=$e^{j\theta[k]}\hat{d}$[k]−y[k]. It will be appreciated that it is assumed here that the receiver has determined which of the three constellations of FIG. 9 is being transmitted, because R is different for each of these constellations. Additionally, RCCR requires knowledge of the constellation and, in particular, knowledge of the power of the corner symbols of the constellation.

CMA with an Unknown Constellation

In the example described herein, one of three different QAM constellations may be transmitted and the equalization and phase/frequency recovery described above requires knowledge of the transmitted constellation. While the constellation selection is encoded in the mode symbols, equalization and phase/frequency recovery precede the frame sync (see FIG. 12) where this information can be directly decoded as described above (e.g., with reference to FIGS. 10, 12 and 15). Consequently, in certain embodiments, the constellation is determined within the equalizer and carrier recovery algorithm itself.

Note that R (as provided in eq. 3), is constellation dependent. In certain embodiments (see, e.g., FIG. 9), the real and imaginary parts of the symbols for 64-QAM are chosen from the set $\pm\{1,3,5,7\}$, the real and imaginary parts of the symbols for 16-QAM are chosen from the set $\pm\{2,6\}$ and the real and imaginary parts of the symbols for QPSK are chosen from the set $\pm 4$. in accordance with eq. 3, the values for R would be $$R = \begin{cases} 58 & \text{For } 64\text{-}QAM \\ 52.8 & \text{For } 16\text{-}QAM \\ 32 & \text{For } QPSK \end{cases} \qquad \text{eq. 4}$$

For any of the three constellations, it can be shown that the use of a scaled value αR for the CMA error calculation causes the equalizer filter taps to converge to the same set of values scaled by $\sqrt{\alpha}$, with the equalizer output likewise scaled. It can be shown that the ISI is nevertheless minimized. In one example where the constellation is unknown, R can be set to 58 and, regardless of the transmitted constellation, the 151 will be minimized during stage 1. For the example described, any value of R in the range 32-58 can be used. However, the selection of the largest value (viz. 58) prevents compression of the most dense constellation (here, 64-QAM) at the equalizer output and reduces the burden on equalizer performance.

The use of scaled CMA parameter R results in a scaling upwards of the equalized output by the converged filter taps such that the statistics of the equalizer output will be:

$$E\{|y[k]|^4\}/E\{|y[k]|^2\}=58,$$

assuming perfect ISI removal and regardless of the constellation. Thus, for QPSK, the equalizer output will be scaled as follows after the ISI has been minimized during stage 1:

$$y[k] = e^{j2\pi f_0 kT_s + \theta_0}\sqrt{\frac{58}{32}}(\pm 4 \pm j4) = e^{j2\pi f_0 kT_s + \theta_0}(\pm 5.385 \pm j5.385).$$

Figure 22A:
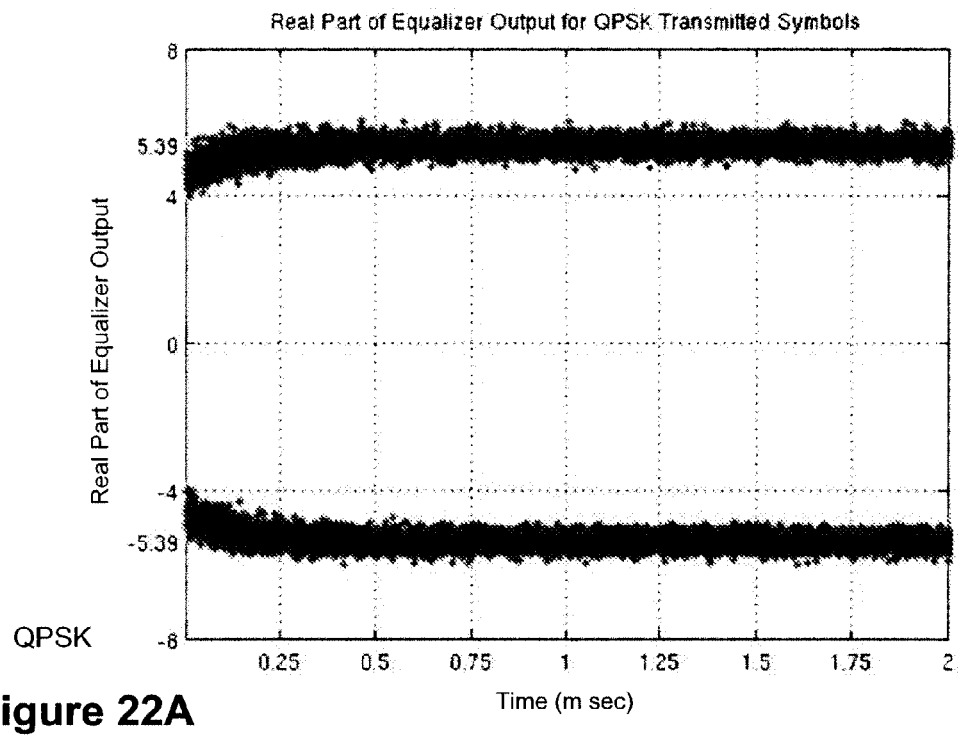
FIGS. 22A and 22B depict the real part of equalized outputs in a QPSK signal (FIG. 22A) and a 16-QAM signal (FIG. 22B).
Figure 22B:
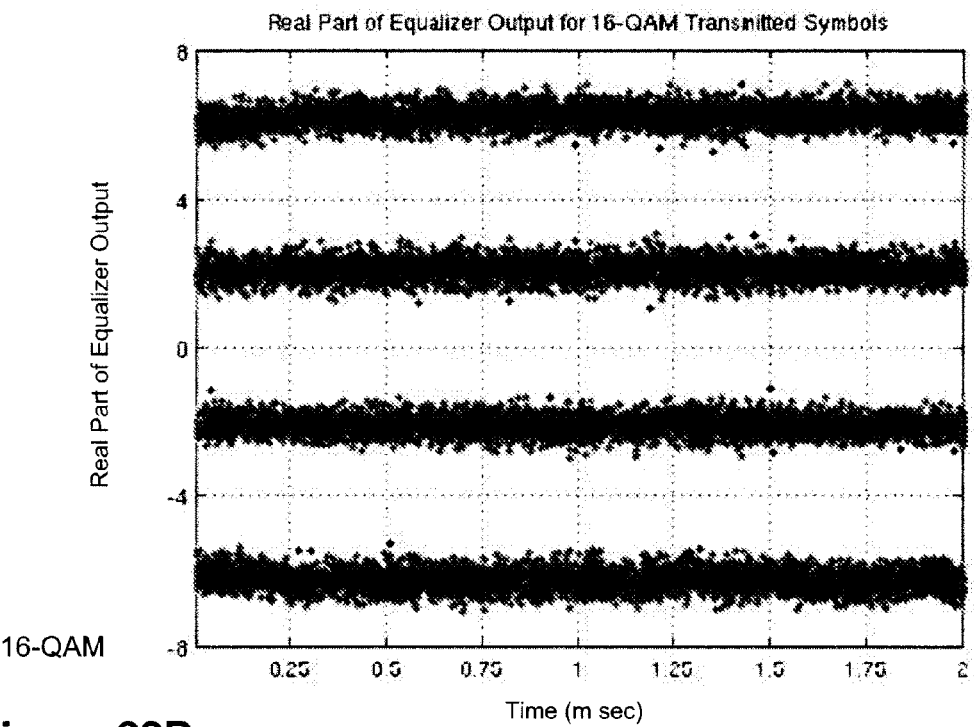

FIG. 22A illustrates the real part of the equalized output for a system with QPSK for the case where $\theta_0=f_0=0$. It can be seen that the output is scaled by $\sqrt{58/32}$ due to the value of R=58, as the equalizer is converging to a solution that removes the ISI. FIG. 22B illustrates the real part of the equalized output for a system with 16-QAM for the case where $\theta_0=f_0=0$. Because $\sqrt{58/52.8}$ is relatively close to 1, the real part of the equalizer output appears to be only slightly scaled. Thus the actual scaling is evident during the equalizer convergence.

Constellation Detection Methods

Figure 23A:
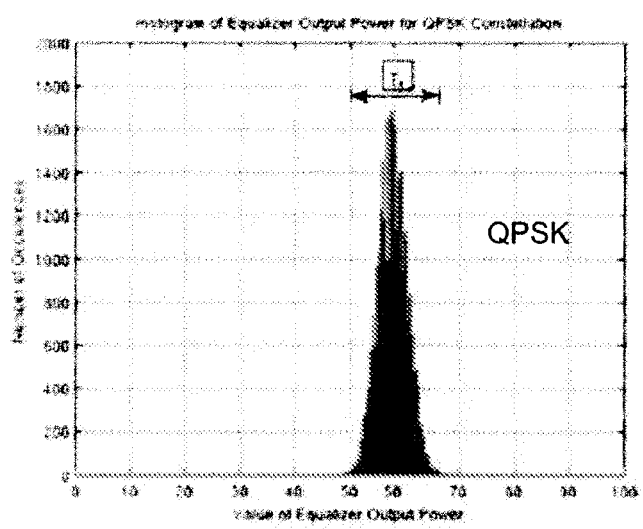
FIGS. 23A, 23B and 23C are histograms for the power of an equalized output when the constellation is QPSK, 16-QAM and 64-QAM (generated when equalizer converged at R=58).
Figure 23B:
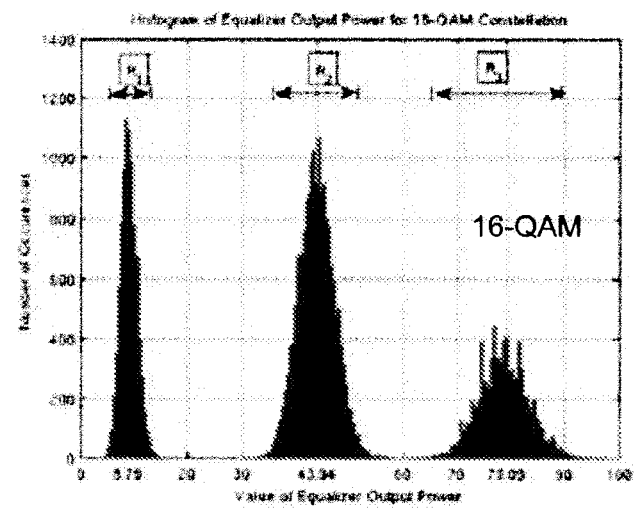
Figure 23C:
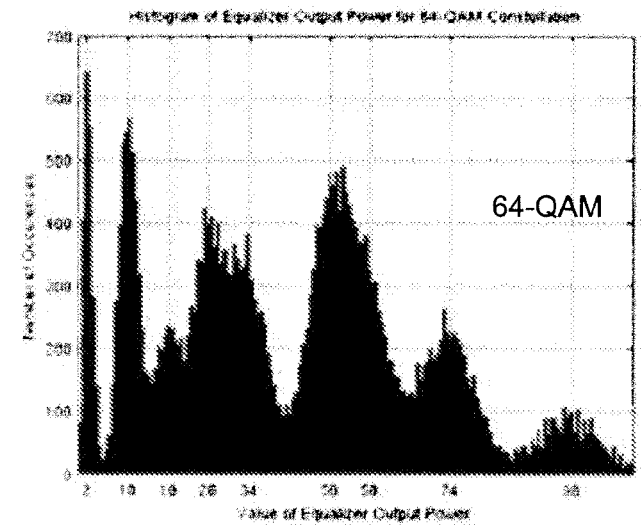

A histogram method described here is one method that can be used to determine the constellation before entering stage 2. The constellation can be determined even though the carrier phase and frequency has not yet been recovered. Consider the histogram of the power of the equalizer output, $\eta[k]=y[k]y^*[k]$, shown in FIGS. 23A, 23B and 23C for the QPSK, 16-QAM, and 64-QAM constellations respectively. The histograms represent the power after the equalizer converged with R=58. Since the power of the equalizer output is independent of the phase and the histograms for each constellation are substantially different, the transmitted constellation can be determined in the receiver from the equalizer output power histogram.

Without additive or tap noise, the power of each equalizer output sample is $\eta[k]=58$ the QPSK constellation. For the 16-QAM constellation, the probability mass function for the power of the equalizer output is:

$$Pr\{\eta[k] = \xi\} = \begin{cases} 1/4 & \text{for } \xi = 8\cdot 58/52.8, 72\cdot 58/52.8 \\ 1/2 & \text{for } \xi = 40\cdot 58/52.8 \end{cases} \qquad \text{eq. 5}$$

Similarly, for the 64-QAM constellation, the probability mass function for the equalized output power is:

$$Pr\{\eta[k] = \xi\} = \begin{cases} 1/16 & \text{for } \xi = 2, 18, 98 \\ 1/8 & \text{for } \xi = 10, 26, 34, 58, 74 \\ 3/16 & \text{for } \xi = 50 \end{cases} \qquad \text{eq. 6}$$

Due to tap update noise and the additive noise v' on the input signal, there is some spread in the histograms around these values even for a substantial SNR of, for example, 30 dB. Modeling the noise on the equalizer output as additive and independent of the symbols, and assuming the output is free of ISI, $$|y[k]|^2 = |d[k]+n[k]|^2 = |d[k]+n[k]|^2 = |d[k]|^2+|n[k]|^2+ 2Re\{d[k]n^*[k]\} \qquad \text{eq. 7}$$

The variance, conditioned on a given symbol, associated with the $2Re\{d[k]n^*[k]\}$ term increases with increasing symbol power. In the histogram figures, this phenomenon presents as the spread, i.e. the variance, around a given constellation power increasing with increasing symbol power. In the 16-QAM case, the spread about the constellation power of symbols $\pm 2.1 \pm j2.1$ is less than the spread about the constellation power of symbols $\pm 6.3 \pm j6.3$.

Certain other relationships can be observed from the histograms of the equalizer output power:

Region $T_1$, in the QPSK histogram falls roughly between the second and third regions, $R_2$ and $R_3$, respectively, in the 16-QAM histogram. Therefore, the regions to declare which symbol power was transmitted are non-overlapping for the QPSK and 16-QAM constellations.

A comparison of the QPSK histogram to the 64-QAM histogram reveals that $Pr\{\eta[k] \in T_1\} < Pr\{\eta[k] \notin T_1\}$ for 64-QAM. Thus, for a comparison of $\eta[k]$ to the region $T_1$, it is more likely for $\eta[k]$ to be outside that region.

In the absence of noise in the 64-QAM example, $\eta[k]$ takes a value from the set $\{2, 18, 26, 34, 58, 98\}$ with probability 9/16. Thus, ignoring noise, when the underlying constellation is 64-QAM:

$$Pr\{(\eta[k] \in R_1) \cup (\eta[k] \in R_2) \cup (\eta[k] \in R_3)\} < 1/2, \qquad \text{eq. 8}$$

where $\cup$ indicates an OR. Therefore, if the transmitted constellation is 64-QAM and $\eta[k]$ is compared to the regions $R_1$, $R_2$, and $R_3$, it is more likely for $\eta[k]$ to be outside of those regions.

Certain embodiments employ an algorithm based on these observations. The algorithm may be initiated after the equalizer has converged and, in a first portion, increments the QPSK counter, $\lambda_4[k]$, if the equalizer output power is in region, $T_1$, over N equalizer output samples. If the equalizer output power is not in the region $T_1$, the counter is decremented. Similarly, the 16-QAM counter, $\lambda_{16}[k]$ is incremented if $\eta[k]$ is within the regions $R_1$, $R_2$, and $R_3$, and decremented otherwise.

```
k = 0, λ_4[-1] = 0, λ_16[-1] = 0
while k ≤ N do
    η[k] = y[k]y*[k];
    If η[k] ∈ T_1 then
        λ_4[k] = λ_4[k - 1] + 1;
    else
        λ_4[k] = max{λ_4[k - 1] - 1,0};
    end if
    If ((η[k] ∈ R_1) ∪ (η[k] ∈ R_2) ∪ (η[k] ∈ R_3)) then
        λ_16[k] = λ_16[k - 1] + 1;
    else
        λ_16[k] = max{λ_16[k - 1] - 1,0};
    end if
    k = k + 1;
end while
```

After N equalizer output samples, it can be assumed that the histograms have been correctly characterized. If the underlying constellation is 64-QAM, the QPSK and 16-QAM counters will be quite small since more likely than not, the power estimate, $\eta[k]$, will fall outside of the QPSK and 16-QAM regions. If the transmitted constellation is either QPSK or 16-QAM, the counter of the transmitted constellation will be considerably larger. Thus,

```
If (λ_4[N] < M) ∩ (λ_16[N] < M) then
    64-QAM Constellation Transmitted.
else
    If λ_4[N] > λ_16[N]
        QPSK Constellation Transmitted.
    else
        16-QAM Constellation Transmitted.
    end if
end if
```

The threshold, M, can be experimentally determined, but should be relatively small in relation to N. The algorithm is extremely robust, reliably selecting the correct constellation for low signal-to-noise ratios ("SNR") when QPSK, 16-QAM, or 64-QAM are transmitted. After the constellation has been reliably determined, R can be set to the correct eq. 4 value and stage 1 can be run to completion. The equalizer output will be properly scaled and stage 2 can commence with the knowledge of the threshold $\xi$ required for RCCR.

Figure 24:
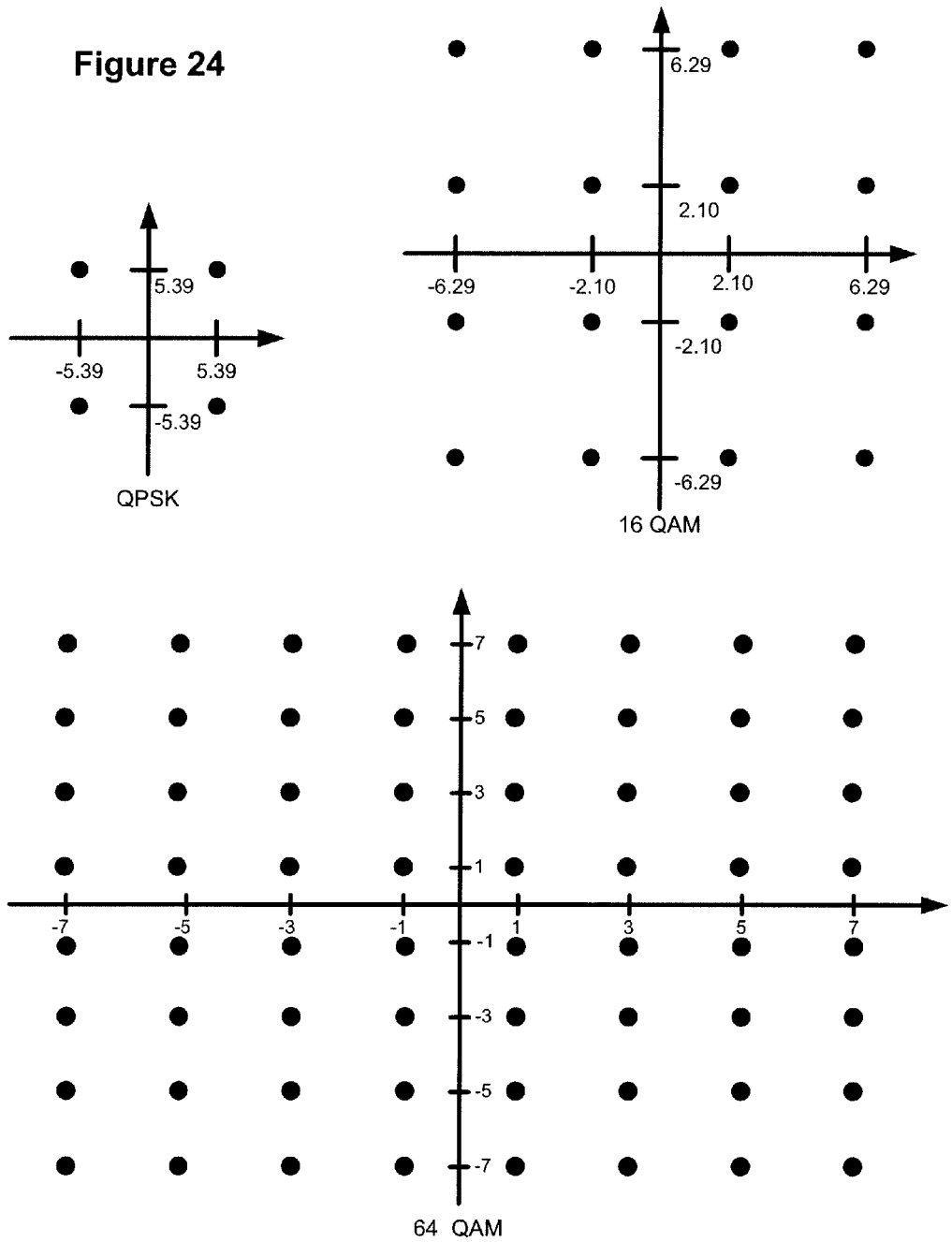
FIG. 24 illustrates three constellations at the equalizer output and carrier phase/frequency recovery loop module input.
Figure 25:
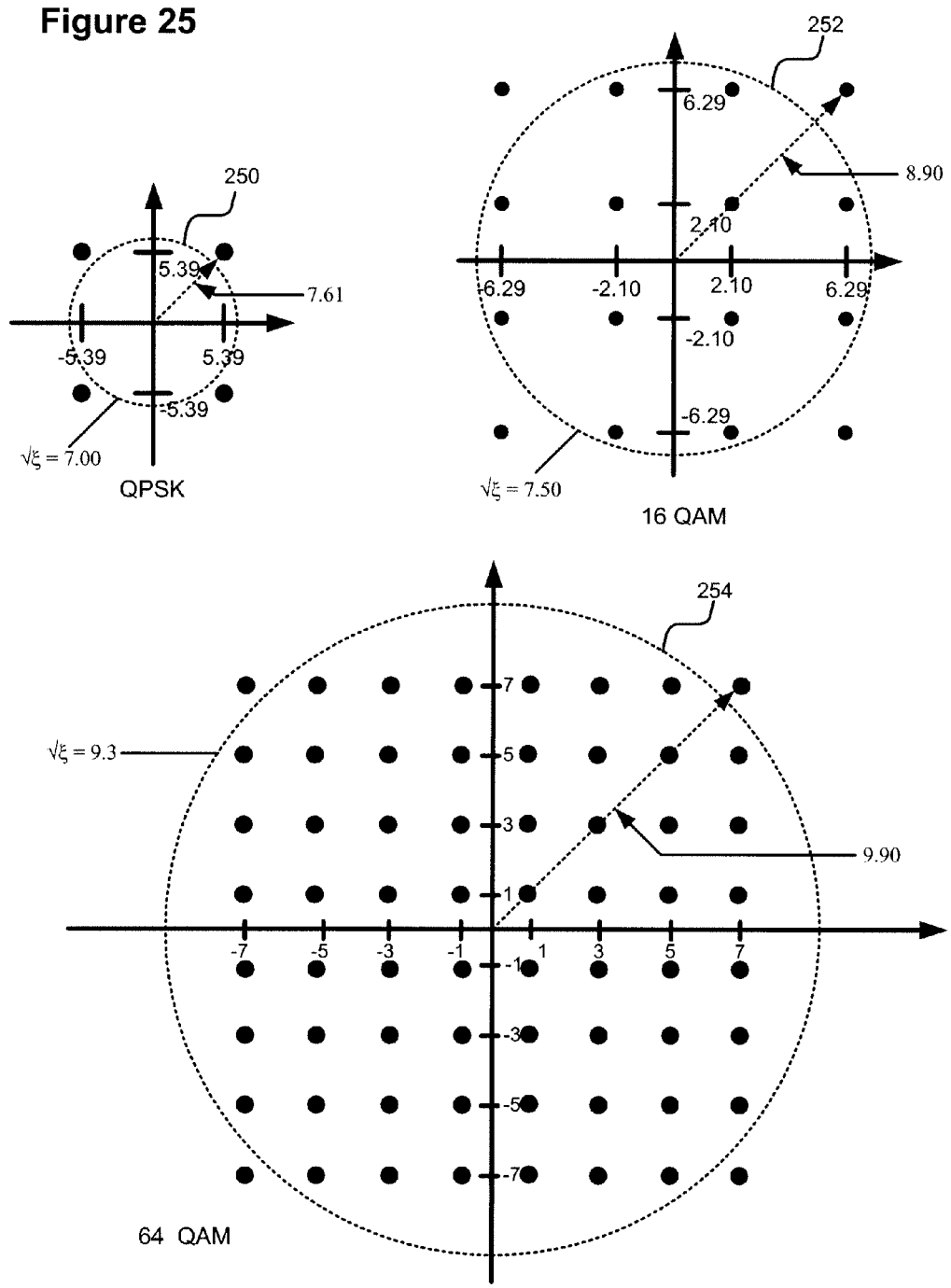
FIG. 25 shows three constellations at the equalizer output with threshold values selected to isolate corner points.
Figure 26:
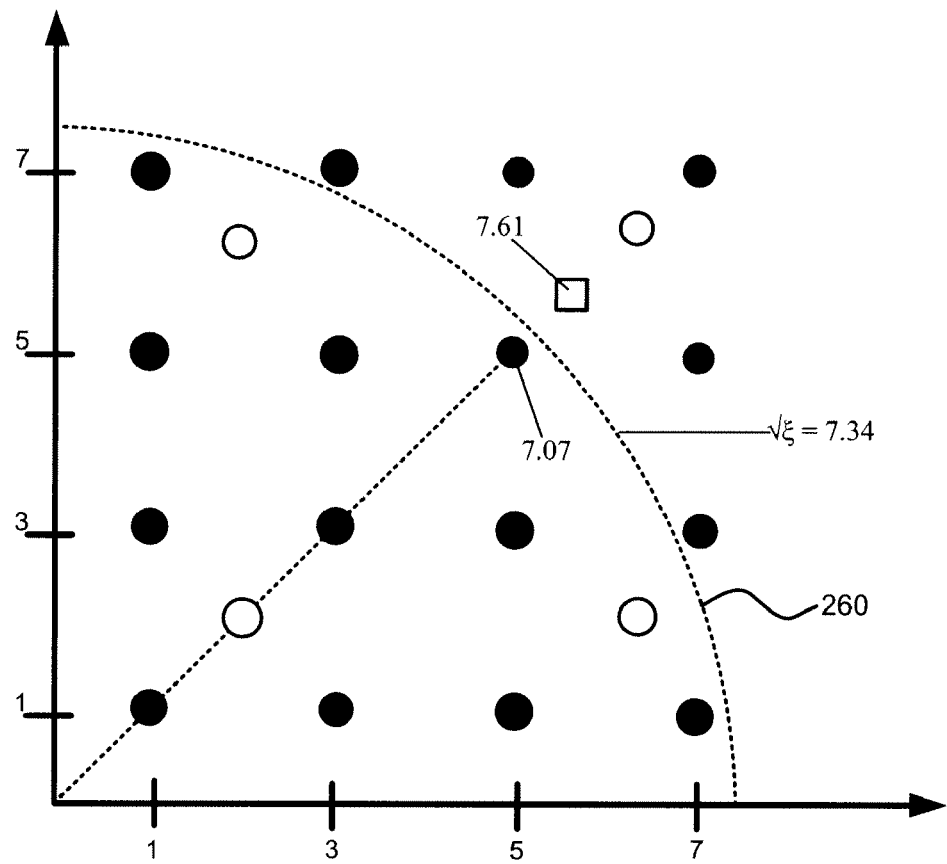
FIG. 26 shows the upper right hand quadrant of all three constellations overlaid on the same plot

Another method of determining the constellation prior to the equalizer entering stage 3 is now described. In this method, stage 1 executes and is allowed to complete with R=58. Thus, as explained, all three constellations will have been scaled at the equalizer output resulting in y[k] as shown in the three constellations of FIG. 24, though these constellations will likely be spinning. As discussed in relation to FIG. 19, a key to stage 2 RCCR is the consideration of only symbols where the power of the symbol z[k] as given by $|z[k]|^2$ exceeds a threshold $\xi$. It may then be presumed that z[k] is one of the corner symbols of the constellation. Equivalently, $|z[k]| > \sqrt{\xi}$ can indicate a corner symbol. It is relatively easy to select a value for $\xi$ when the constellation is known, as is illustrated in FIG. 25(a) for the 64-QAM constellation. It can be seen that $|z[k]|=9.90$ for the corner points. For example, a threshold of $\sqrt{\xi}=9.30$, indicated by the dotted line circle, ensures that only the corner points are selected. Similarly, $\sqrt{\xi}=7.5$ and $\sqrt{\xi}=7.0$ can be used for 16-QAM and QPSK, respectively with comfortable margins. FIG. 25 shows all three constellations at the equalizer output and carrier phase/frequency recovery loop module input. FIG. 26 shows an overlay plotting of the upper right hand quadrant of all three constellations. It can be seen that if $\sqrt{\xi}=7.34$, only the corner points for QPSK and 16-QAM, which fall outside the dotted circle, will be utilized by RCCR. However, if 64-QAM is received, five constellation points (four non-corner) fall outside the circle and will be utilized by RCCR.

RCCR typically works best if only corner constellation points are used since the recovered phase is less noisy. However, RCCR will successfully recover phase even if some additional points are used, although an increase in phase noise will result. Therefore, stage 2 can operate initially with $\sqrt{\xi}=7.34$, allowing for adequate initial carrier recovery for all three constellations while the constellation remains unknown to the receiver.

As described above in relation to FIG. 12, equalizer 1200 feeds a 2-level slicer 1218 which in turn feeds frame sync 1220. Frame sync 1220 can perform a continuous cross-correlation operation on the sign of the incoming sliced QAM symbols, with a stored copy of the binary frame-sync PN sequence, as described by eq. 1. The continuous cross-correlation operation can be performed separately for both the real and imaginary parts. Each member of the stored copy has a value of −1 or +1. The maximum magnitude of either $b_R$ or $b_I$ indicates the start of the FEC data frame. The only difference now is that for the 64-QAM constellation, 2-level slicer 1218 operates on a signal that has some additional phase noise. However, this additional phase noise has very little detrimental affect on the 2-level slicing and subsequent cross-correlation based frame sync, which is very robust even in the presence of the phase noise. Decoding of the constellation codeword, as previously described, is also very robust to the phase noise.

Figure 27:
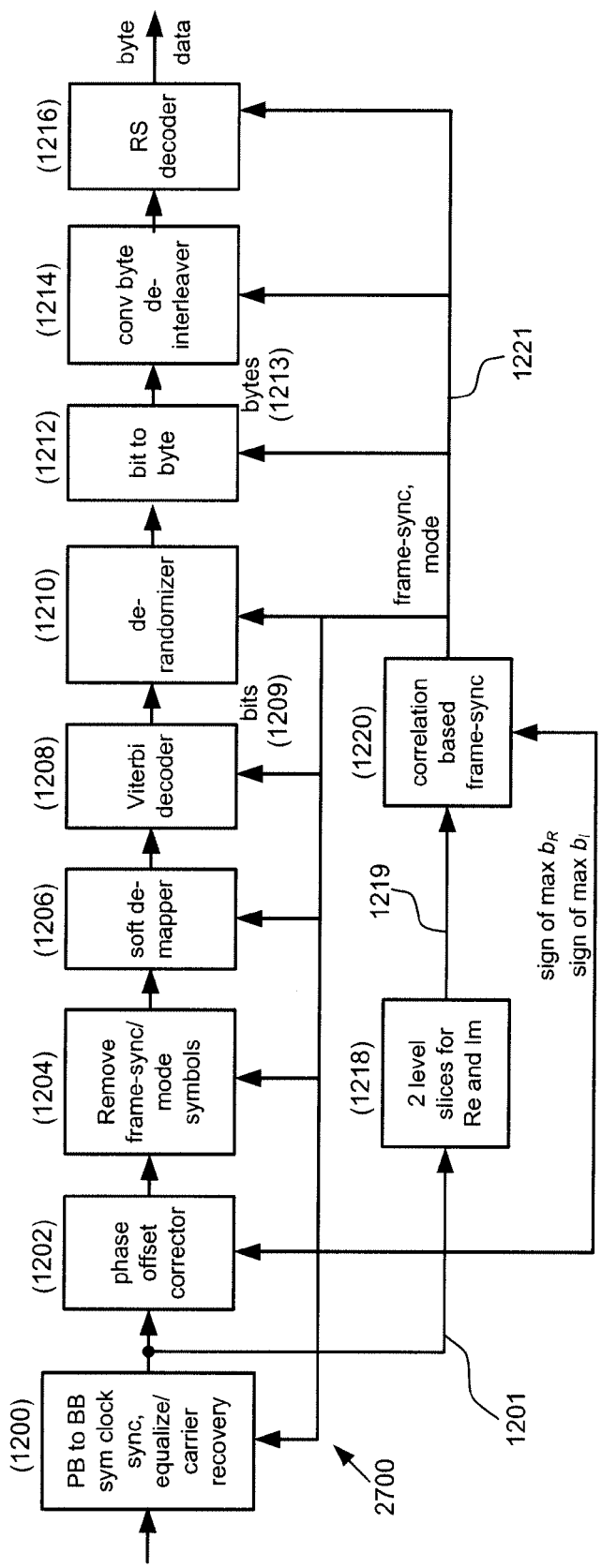
FIG. 27 is a block schematic of a demodulator for improved constellation detection according to certain aspects of the invention.

FIG. 27 illustrates the operation of this alternative approach to determining the constellation, which can be summarized as follows:

(1) The equalizer and phase/frequency loop completes stage 1 with R=58, then enters stage 2.
(2) Instead of waiting for stage 3, the correlation based frame-sync 1220 accepts input data during stage 2, finds frame sync, and decodes the constellation codeword.
(3) The determined constellation information 1221 is sent back to the equalizer 1200 and phase/frequency loop, which goes back to stage 1 using an R value that properly corresponds to the determined constellation.
(4) Stages 1, 2 and 3 are then completed as before.

It will be appreciated that the primary difference between the systems depicted in FIG. 27 and FIG. 12 is the additional connection 2700 from the frame-sync 1220 to the equalizer/carrier recovery 1200 which carries the constellation information.

Processor Description

Certain embodiments of the invention employ processing systems embodied in modems and or other computing systems. The processing systems typically incorporate hardware, firmware and software elements that cooperate to perform certain of the functions described above. Processing systems may be comprise commercially available microprocessors, microcontrollers, logic arrays, sequencers and combinations of such components. Systems may employ commercially available operating systems such as Microsoft Windows®, UNIX or a variant thereof, Linux, a real time operating system and or a proprietary operating system. The architecture of the processing system may be adapted, configured and/or designed for integration in other devices such as monitors, displays, cameras, networking equipment and other devices.

Processing system also typically comprises memory that may include one or more of random access memory ("RAM"), static memory, cache, flash memory and any other suitable type of storage device that can be used for storing instructions and data that can cause one or more of processors to perform a desired process and/or function. Non-volatile storage may include, for example, read only memory ("ROM"), flash memory, memory cards or the like, magnetic disk, DVD, CD-ROM and BluRay, other optical disk and flash disk.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems and methods for identifying symbol constellations. In some of these embodiments, the method is performed by one or more processors of a multi-mode quadrature amplitude modulated communications system. Some of these embodiments comprise executing instructions that cause the one or more processors to perform steps of a process. These steps comprise characterizing power distribution in a signal. In some of these embodiments, the power distribution statistically tracks occurrences of power levels detected in the signal. These steps comprise determining one or more peak occurrences of power levels within the power distribution. These steps comprise determining the constellation based on distribution of the peak occurrences. In some of these embodiments, the constellation is determined based on spread of the one or more peak occurrences.

In some of these embodiments, the signal is an equalized signal. In some of these embodiments, the one or more processors determine the constellation by examining a plurality of sections in a histogram of the power distribution. In some of these embodiments, each of the sections corresponds to a range of power levels associated with one but not all of a plurality of constellation candidates. In some of these embodiments, the plurality of constellation candidates includes a quadrature phase shift key constellation and a quadrature amplitude modulation (QAM) constellation. In some of these embodiments, the plurality of constellation candidates includes a 16-QAM and 64-QAM constellations. In some of these embodiments, the plurality of constellation candidates includes a 256-QAM constellation.

In some of these embodiments, the steps comprise establishing reliability of an identified constellation by performing additional steps for each of a succession of constellation determinations. In some of these embodiments, the additional steps include incrementing a counter when a succeeding determination confirms the identity of the constellation. In some of these embodiments, the additional steps include decrementing the counter when a succeeding determination identifies a different constellation. In some of these embodiments, the additional steps include providing a measure of reliability based on the value of the counter. In some of these embodiments, the constellation is identified when the counter exceeds a threshold value. In some of these embodiments, a counter is provided for each of a plurality of constellation candidates and wherein the constellation is identified when its corresponding counter exceeds a threshold value. In some of these embodiments, the peak occurrences of power levels correspond to corner symbols of the constellation. In some of these embodiments, the constellation is identified before the signal is equalized.

Certain embodiments of the invention provide systems and methods for identifying a constellation of symbols in a multi-mode quadrature amplitude modulated communications system, the method being performed by a processor in a modem of the communications system. In some of these embodiments, the method comprises executing instructions that cause the processor to extract mode information from the frame of data in response to detection of a start of a frame of data received at the modem. In some of these embodiments, the method comprises determining a current constellation by selecting from a plurality of potential constellation codes a code that most closely matches a corresponding code in the mode bits. In some of these embodiments, the method comprises increasing a confidence metric associated with the previously identified constellation if the current constellation matches a previously determined constellation. In some of these embodiments, the method comprises decreasing the confidence metric and recording the current constellation as the previously identified constellation if the current constellation is different from the previously identified constellation. In some of these embodiments, the method comprises repeating the steps of extracting mode information, selecting a current constellation and adjusting the confidence metric for subsequent frames of data until the confidence metric exceeds a predetermined threshold.

In some of these embodiments, the constellation is identified when the confidence metric exceeds the predetermined threshold. In some of these embodiments, selecting a constellation code includes causing the processor to perform cross-correlations for each of the plurality of potential constellation codes with the corresponding code bits. In some of these embodiments, the constellation is identified in an unequalized signal that carries the frame of data and subsequent frames of data. In some of these embodiments, the constellation is identified while the processor is recovering a carrier from the signal. Some of these embodiments comprise executing instructions that cause the processor to calculate an error signal using a constant modulus algorithm (CMA) to converge equalizer filter taps to permit equalization of the signal. In some of these embodiments, the error signal is calculated using a scaled CMA parameter to improve equalization performance. In some of these embodiments, performing equalization of the signal includes analyzing histograms of power of the equalized signal. In some of these embodiments, analyzing the histograms includes using a probability mass function. In some of these embodiments, performing equalization of the signal includes calculating the power associated with a plurality of symbols in the equalized signal. In some of these embodiments, performing equalization of the signal includes identifying corner symbols of the constellation by using a threshold power level. In some of these embodiments, the threshold power level indicates the identity of the constellation.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for identifying a constellation of symbols in a multi-mode quadrature amplitude modulated communications system symbols, the method being performed by a modem, the method comprising: characterizing power distribution in a signal, wherein the power distribution statistically tracks occurrences of power levels at a plurality of frequencies detected in the signal; determining one or more peak occurrences of power levels within the power distribution; and identifying the constellation of symbols in a multi-mode quadrature amplitude modulated communications system symbols based on distribution of the peak occurrences.

2. The method of claim 1, wherein the constellation is determined based on a variance of the one or more peak occurrences relative to a predefined constellation power.

3. The method of claim 1, wherein the constellation is determined by examining a plurality of sections in a histogram of the power distribution, wherein each of the sections corresponds to a range of power levels associated with only one of a plurality of constellation candidates.

4. The method of claim 3, wherein the plurality of constellation candidates includes a quadrature phase shift key constellation and a quadrature amplitude modulation (QAM) constellation.

5. The method of claim 4, wherein the plurality of constellation candidates includes 16-QAM and 64-QAM constellations.

6. The method of claim 4, wherein the plurality of constellation candidates includes a 256-QAM constellation.

7. The method of claim 1, further comprising establishing reliability of an identified constellation by performing steps for each of a succession of constellation determinations by:
    incrementing a counter when a succeeding determination confirms the identity of the constellation;
    decrementing the counter when a succeeding determination identifies a different constellation; and
    providing a measure of reliability based on the value of the counter.

8. The method of claim 7, wherein the constellation is reliably identified when the counter exceeds a threshold value.

9. The method of claim 7, wherein a counter is provided for each of a plurality of constellation candidates and wherein the constellation is reliably identified when its corresponding counter exceeds a threshold value.

10. The method of claim 1, wherein the peak occurrences of power levels correspond to corner symbols of the constellation.

11. The method of claim 1, wherein the constellation is identified before the signal is equalized.

12. The method of claim 1, further comprising equalizing the signal, wherein the constellation is identified after the signal is equalized.

* * * * *